United States Patent [19]

Yuzawa et al.

[11] E Patent Number: Re. 33,607

[45] Reissued Date of Patent: Jun. 11, 1991

[54] AUTO-PLAYING APPARATUS

[75] Inventors: Keiji Yuzawa, Tokyo; Naoaki Matsumoto, Tachikawa; Takehiko Kayahara, Sayama; Naofumi Tateishi, Oome; Makoto Fukuda, Sayama, all of Japan

[73] Assignee: Casio Computer Co. Ltd., Tokyo, Japan

[21] Appl. No.: 473,119

[22] Filed: Jan. 30, 1990

Related U.S. Patent Documents

Reissue of:

[64] Patent No.: 4,624,171
Issued: Nov. 25, 1986
Appl. No.: 821,521
Filed: Jan. 23, 1986

U.S. Applications:

[63] Continuation of Ser. No. 275,439, Nov. 23, 1988, abandoned, which is a continuation of Ser. No. 597,168, Apr. 5, 1984, abandoned.

[30] Foreign Application Priority Data

Apr. 13, 1983 [JP] Japan ..... 58-63732

[51] Int. Cl.[5] ..... G10F 1/00; G10H 1/42; G10H 7/00

[52] U.S. Cl. ..... 84/609; 84/611; 84/613; 84/642; 84/DIG. 29

[58] Field of Search ..... 84/609–614, 84/634–638, 642, DIG. 12, DIG. 29

[56] References Cited

U.S. PATENT DOCUMENTS 4,250,787 2/1981 Segan et al. .
4,326,276 4/1982 Scott, Jr. .
4,355,559 10/1982 Uya et al. ..... 84/1.03
4,375,177 3/1983 McCoskey ..... 84/1.03
4,387,620 6/1983 Okamoto et al. ..... 84/1.03
4,399,731 8/1983 Aoki ..... 84/1.03
4,406,203 9/1983 Okamoto et al. ..... 84/1.03
4,417,494 11/1983 Nakada et al. ..... 84/1.03
4,466,324 8/1984 Okamoto et al. ..... 84/1.03
4,536,863 8/1985 Giddings .
4,614,983 9/1986 Usami .
4,615,024 9/1986 Usui ..... 84/1.03 X
4,656,535 4/1987 Usui .

FOREIGN PATENT DOCUMENTS 3309899 9/1983 Fed. Rep. of Germany .
53-133468 11/1978 Japan .
54-159027 12/1979 Japan .
5786888 11/1980 Japan .
58-076889 5/1983 Japan .
58-159593 10/1983 Japan .
1541856 3/1979 United Kingdom .
2120441 11/1983 United Kingdom .
2127607 4/1984 United Kingdom .

*Primary Examiner*—Stanley J. Witkowski
*Attorney, Agent, or Firm*—Frishauf, Holtz, Goodman & Woodward

[57] ABSTRACT

Data for a plurality of musical pieces is preset in a ROM pack and also on a tape recorder. Musical piece data read out from the ROM pack or tape recorder is supplied from a control section to melody generators, a chord generator, a bass generator and a rhythm generator. Melody data, chord data, and rhythm data obtained from these generators are coupled through an amplifier to a loudspeaker.

11 Claims, 34 Drawing Sheets

FIG. 9E

| |
|---|
| REST (DURATION=0) |
| BAR DATA |
| TIME DATA |
| KEY DATA |
| TIMBRE (ON) |
| (EFFECT (ON)) |
| ⋮ |
| TIMBRE (OFF) |
| (EFFECT (OFF)) |
| END |

FIG. 9F

| |
|---|
| REST (DURATION=0) |
| TIMBRE (ON) |
| (EFFECT (ON)) |
| ⋮ |
| TIMBRE (OFF) |
| (EFFECT (OFF)) |
| END |

FIG. 9G

| |
|---|
| REST (DURATION=0) |
| COUNTER RESET |
| RHYTHM IDENTIFICATION |
| TEMPO (ON) |
| REST |
| RHYTHM (ON) |
| ⋮ |
| RHYTHM (OFF) |
| TEMPO (OFF) |
| END |

FIG. 10A-1

| 8 4 2 1 | | | |
|---|---|---|---|
| | SC, OC | PITCH | NORMAL TONE DURATION |
| | L1, L2 | TONE DURATION | |
| | L1, L2 | REST DURATION | |

FIG. 10A-2

| 8 4 2 1 | | | |
|---|---|---|---|
| | SC, OC | PITCH | DOUBLE DURATION |
| | L1, L2 | TONE DURATION (LOWER BIT) | |
| | L1, L2 | REST DURATION (LOWER BIT) | |
| 0 0 0 0 / 0 0 1 0 | | DOUBLE DURATION COMMAND | |
| | U1, U2 | TONE DURATION (UPPER BIT) | |
| | U1, U2 | REST DURATION (UPPER BIT) | |

FIG. 10B

| 8 4 2 1 | | |
|---|---|---|
| 0 0 0 0 / 0 0 0 1 | | REST DURATION COMMAND |
| 0 0 0 0 / 0 0 0 0 | L1, L2 | REST DURATION |

| 8 4 2 1 | |
|---|---|
| X X X X | REPEAT COMMAND |
| X X X X | |
| 0 0 0 0 | NO CHORD |
| 0 0 0 0 | |
| 0 0 0 0 | NO CHORD |
| 0 0 0 0 | |

FIG. 10D-1

| ON (8 4 2 1) | OFF (8 4 2 1) | | |
|---|---|---|---|
| 0,0,0,0 | 0,0,0,0 | | TIMBRE COMMAND |
| 0,1,1,0 | 0,1,1,0 | | |
| X,X,X,X | X,X,X,X | | TIMBRE DATA |
| 0,X,X,X | 1,X,X,X | | |
| , , , | , , , | L1 | REST DURATION |
| , , , | , , , | L2 | |

FIG. 10D-2

| ON (8 4 2 1) | OFF (8 4 2 1) | | |
|---|---|---|---|
| 0,0,0,0 | 0,0,0,0 | | TIMBRE COMMAND |
| 0,1,1,0 | 0,1,1,0 | | |
| X,X,X,X | X,X,X,X | | TIMBRE DATA |
| 0,X,X,X | 1,X,X,X | | |
| , , , | , , , | L1 | REST DURATION (LOWER BIT) |
| , , , | , , , | L2 | |
| 0,0,0,0 | 0,0,0,0 | | DOUBLE DURATION COMMAND |
| 0,0,1,0 | 0,0,1,0 | | |
| 0,0,0,0 | 0,0,0,0 | | NO CHORD |
| 0,0,0,0 | 0,0,0,0 | | |
| , , , | , , , | U1 | REST DURATION (UPPER BIT) |
| , , , | , , , | U2 | |

FIG. 10D-3

| 8 4 2 1 | | 8 4 2 1 | |
|---|---|---|---|
| 0,0,0,0 / X,0,0,0 | ----- PIANO | 0,0,0,0 / X,1,0,0 | ----- FLUTE |
| 0,0,0,0 / X,0,0,1 | ----- HARP-SICHORD | 0,0,0,0 / X,1,0,1 | ----- CLARINET |
| 0,0,0,0 / X,0,1,0 | ----- ORGAN | 0,0,0,0 / X,1,1,0 | ----- TRUMPET |
| 0,0,0,0 / X,0,1,1 | ----- VIOLIN | 0,0,0,0 / X,1,1,1 | ----- CELESTA |

FIG. 10E-1

| ON (8 4 2 1) | OFF (8 4 2 1) | |
|---|---|---|
| 0,0,0,0 | 0,0,0,0 | EFFECT COMMAND |
| 0,1,0,1 | 0,1,0,1 | |
| X,X,X,X | X,X,X,X | EFFECT DATA |
| 0,X,X,X | 1,0,0,0 | |
| , , , | , , , | L1, L2 REST DURATION |
| , , , | , , , | |

FIG. 10E-2

| ON (8 4 2 1) | OFF (8 4 2 1) | |
|---|---|---|
| 0,0,0,0 | 0,0,0,0 | EFFECT COMMAND |
| 0,1,0,1 | 0,1,0,1 | |
| X,X,X,X | X,X,X,X | EFFECT DATA |
| 0,X,X,X | 1,X,X,X | |
| , , , | , , , | L1, L2 REST DURATION (LOWER BIT) |
| , , , | , , , | |
| 0,0,0,0 | 0,0,0,0 | DOUBLE DURATION COMMAND |
| 0,0,1,0 | 0,0,1,0 | |
| 0,0,0,0 | 0,0,0,0 | NO CHORD |
| 0,0,0,0 | 0,0,0,0 | |
| , , , | , , , | U1, U2 REST DURATION (UPPER BIT) |
| , , , | , , , | |

FIG. 10E-3

| 8 4 2 1 | |
|---|---|
| 0,0,0,0 | ----- SHORT SUSTAIN |
| X, , , | |
| 0,0,0,1 | ----- VIBRATO |
| X,0,0,0 | |
| 0,0,1,0 | ----- DELAY VIBRATO |
| X,0,0,0 | |

| ON 8 4 2 1 | OFF 8 4 2 1 | |
|---|---|---|
| 0,0,0,0 | 0,0,0,0 | TIE COMMAND |
| 1,0,1,0 | 1,0,1,1 | |
| 0,0,0,0 | 0,0,0,0 | NO CHORD |
| 0,0,0,0 | 0,0,0,0 | |
| 0,0,0,0 | 0,0,0,0 | NO CHORD |
| 0,0,0,0 | 0,0,0,0 | |

| 8 4 2 1 | |
|---|---|
| 1,1,1,0 | TIME SYMBOL COMMAND |
| 0,0,0,1 | |
| X,X,X,X | L) U) TIME SYMBOL |
| X,X,X,X | |
| 0,0,0,0 | NO CHORD |
| 0,0,0,0 | |

| 8 4 2 1 | |
|---|---|
| 1,1,1,0 | KEY SYMBOL COMMAND |
| 0,0,1,0 | |
| , , , | L) U) KEY SYMBOL |
| , , , | |
| 0,0,0,0 | NO CHORD |
| 0,0,0,0 | |

| 8 4 2 1 | |
|---|---|
| 1,1,1,0 | BAR COMMAND |
| 0,0,0,0 | |
| 0,0,0,0 | NO CHORD |
| 0,0,0,0 | |
| 0,0,0,0 | NO CHORD |
| 0,0,0,0 | |

| 2 DIGITS | | |
|---|---|---|
| | TIE ON | TIE ON |
| | 0 | |
| | 0 | |
| | G | NOTE |
| | ♩ | |
| | 𝄾 = ZERO | |
| | 1. | REPEAT DATA |
| | 0 | |
| | 0 | |
| | TIE OFF | TIE OFF |
| | 0 | |
| | 0 | |
| | G | NOTE |
| | ♪ | |
| | 𝄾 + 𝄾 | |
| | :‖ | REPEAT DATA |
| | 0 | |
| | 0 | |

| | |
|---|---|
| 2. | REPEAT DATA |
| 0 | |
| 0 | |
| TIE OFF | TIE OFF |
| 0 | |
| 0 | |
| G | NOTE |
| ♩ | |
| 𝄾 | |

| 8 4 2 1 |
|---|
| 0,0,0,0 |
| 1,1,1,1 |
| 0,0,0,0 |
| 0,0,0,0 |
| 0,0,0,0 |
| 0,0,0,0 |

FIG. 11A-1

| 8 4 2 1 | | |
|---|---|---|
| X X X X | SC ----- ROOT | NORMAL DURATION |
| X X X X | OC ----- CHORD NAME | |
| | L1 L2) CHORD DURATION | |

FIG. 11A-2

| 8 4 2 1 | | |
|---|---|---|
| X X X X | SC ----- ROOT | DOUBLE DURATION |
| X X X X | OC ----- CHORD NAME | |
| | L1 L2) CHORD DURATION (LOWER BIT) | |
| 0 0 0 0 | DOUBLE DURATION COMMAND | |
| 0 0 1 0 | | |
| | U1 U2) CHORD DURATION (UPPER BIT) | |

FIG. 11A-3

| | 8 4 2 1 | ROOT (SC) | CHORD NAME (OC) |
|---|---|---|---|
| 0 | 0 0 0 0 | – | MAJOR |
| 1 | 0 0 0 1 | C | MINOR |
| 2 | 0 0 1 0 | C# | 7 TH |
| 3 | 0 0 1 1 | D | m7 |
| 4 | 0 1 0 0 | D# | M6 |
| 5 | 0 1 0 1 | E | 6 TH |
| 6 | 0 1 1 0 | F | m7-5 |
| 7 | 0 1 1 1 | F# | SUS 4 |
| 8 | 1 0 0 0 | G | DIM |
| 9 | 1 0 0 1 | G# | AUG |
| A | 1 0 1 0 | A | m6 |
| B | 1 0 1 1 | A# | 7-5 |
| C | 1 1 0 0 | B | 9 TH |
| D | 1 1 0 1 | – | 9 |
| E | 1 1 1 0 | – | OFF CHORD |
| F | 1 1 1 1 | – | ON CHORD |

FIG. 11B-1

| 8 4 2 1 | | | |
|---|---|---|---|
| 0,0,0,0 | | REST COMMAND | NORMAL DURATION |
| 0,0,0,1 | | | |
| , , , | L1 | REST DURATION | |
| , , , | L2 | | |

FIG. 11B-2

| 8 4 2 1 | | | |
|---|---|---|---|
| 0,0,0,0 | | REST COMMAND | DOUBLE DURATION |
| 0,0,0,1 | | | |
| , , , | L1 | REST DURATION (LOWER BIT) | |
| , , , | L2 | | |
| 0,0,0,0 | | DOUBLE DURATION COMMAND | |
| 0,0,1,0 | | | |
| , , , | U1 | REST DURATION (UPPER BIT) | |
| , , , | U2 | | |

FIG. 11C-1

| 8 4 2 1 | |
|---|---|
| X,X,X,X | REPEAT COMMAND |
| X,X,X,X | |
| 0,0,0,0 | NO CHORD |
| 0,0,0,0 | |

FIG. 11C-2

| 8 4 2 1 | | 8 4 2 1 | |
|---|---|---|---|
| 1,1,1,1 / 0,0,0,0 | ‖: | 1,1,1,1 / 1,0,1,1 | 4. |
| 1,1,1,1 / 0,0,0,1 | :‖ | 1,1,1,1 / 1,1,0,0 | 5. |
| 1,1,1,1 / 1,0,0,0 | 1. | 1,1,1,1 / 1,1,0,1 | 6. |
| 1,1,1,1 / 1,0,0,1 | 2. | 1,1,1,1 / 1,1,1,0 | 7. |
| 1,1,1,1 / 1,0,1,0 | 3. | 1,1,1,1 / 1,1,1,1 | 8. |

FIG. 11D-1

| ON (8 4 2 1) | OFF (8 4 2 1) | |
|---|---|---|
| 0,0,0,0 | 0,0,0,0 | RIFIR-D COMMAND |
| X,X,X,X | X,X,X,X | |
| X,X,X,X | X,X,X,X | RHYTHM DATA |
| 0,X,X,X | 1,X,X,X | |

FIG. 11D-2

| 8 4 2 1 | |
|---|---|
| 0,0,0,0 / 0,1,0,1 | ----- RHYTHM COMMAND |
| 0,0,0,0 / 0,1,1,0 | ----- FILL-IN COMMAND |
| 0,0,0,0 / 1,0,0,0 | ----- RHYTHM DISCRIMINATION COMMAND |

FIG. 11D-3

| | | | |
|---|---|---|---|
| 0,0,0,0 / X,0,0,0 | ----- ROCK | 0,0,0,1 / X,0,0,0 | ----- ROCK'N ROLL |
| 0,0,0,0 / X,0,0,1 | ----- DISCO | 0,0,0,1 / X,0,0,1 | ----- 16 BEAT |
| 0,0,0,0 / X,0,1,0 | ----- SWING 2 BEAT | 0,0,0,1 / X,0,1,0 | ----- SWING 4 BEAT |
| 0,0,0,0 / X,0,1,1 | ----- SAMBA | 0,0,0,1 / X,0,1,1 | ----- LATIN ROCK |
| 0,0,0,0 / X,1,0,0 | ----- BOSSA NOVA | 0,0,0,1 / X,1,0,0 | ----- BEGUINE |
| 0,0,0,0 / X,1,0,1 | ----- TANGO | 0,0,0,1 / X,1,0,1 | ----- MARCH |
| 0,0,0,0 / X,1,1,0 | ----- SLOW ROCK | 0,0,0,1 / X,1,1,0 | ----- BALLAD |
| 0,0,0,0 / X,1,1,1 | ----- WALTZ | 0,0,0,1 / X,1,1,1 | ----- ROCK WALTZ |
| | | 0,0,1,0 / X,0,1,0 | ----- LATIN SWING |

FIG. 11E

| ON 8 4 2 1 | OFF 8 4 2 1 | | |
|---|---|---|---|
| 0 0 0 0 | 0 0 0 0 | | TEMPO COMMAND |
| 1 1 0 0 | 1 1 0 0 | | |
| X X X X | X X X X | SC | TEMPO DATA |
| 0 X X X | 1 X X X | OC) | |

FIG. 11F

| 8 4 2 1 |
|---|
| 0 0 0 0 |
| 1 0 0 1 |
| 0 0 0 0 |
| 0 0 0 0 |

FIG. 11G

| 8 4 2 1 |
|---|
| 0 0 0 0 |
| 1 1 1 1 |
| 0 0 0 0 |
| 0 0 0 0 |

FIG. 12

| SC \ OC | 0000 | 0001 | 0010 | 0011 | 0100 | 0101 | 0110 | 0111 |
|---|---|---|---|---|---|---|---|---|
| 0000 | | | | | | | | |
| 0001 | $C_8$ | $C_1$ | $C_2$ | $C_3$ | $C_4$ | $C_5$ | $C_6$ | $C_7$ |
| 0010 | $C_8^{\#}$ | $C_1^{\#}$ | $C_2^{\#}$ | $C_3^{\#}$ | $C_4^{\#}$ | $C_5^{\#}$ | $C_6^{\#}$ | $C_7^{\#}$ |
| 0011 | $D_8$ | $D_1$ | $D_2$ | $D_3$ | $D_4$ | $D_5$ | $D_6$ | $D_7$ |
| 0100 | $D_8^{\#}$ | $D_1^{\#}$ | $D_2^{\#}$ | $D_3^{\#}$ | $D_4^{\#}$ | $D_5^{\#}$ | $D_6^{\#}$ | $D_7^{\#}$ |
| 0101 | $E_8$ | $E_1$ | $E_2$ | $E_3$ | $E_4$ | $E_5$ | $E_6$ | $E_7$ |
| 0110 | $F_8$ | $F_1$ | $F_2$ | $F_3$ | $F_4$ | $F_5$ | $F_6$ | $F_7$ |
| 0111 | $F_0^{\#}$ | $F_1^{\#}$ | $F_2^{\#}$ | $F_3^{\#}$ | $F_4^{\#}$ | $F_5^{\#}$ | $F_6^{\#}$ | $F_7^{\#}$ |
| 1000 | $G_0$ | $G_1$ | $G_2$ | $G_3$ | $G_4$ | $G_5$ | $G_6$ | $G_7$ |
| 1001 | $G_0^{\#}$ | $G_1^{\#}$ | $G_2^{\#}$ | $G_3^{\#}$ | $G_4^{\#}$ | $G_5^{\#}$ | $G_6^{\#}$ | $G_7^{\#}$ |
| 1010 | $A_0$ | $A_1$ | $A_2$ | $A_3$ | $A_4$ | $A_5$ | $A_6$ | $A_7$ |
| 1011 | $A_0^{\#}$ | $A_1^{\#}$ | $A_2^{\#}$ | $A_3^{\#}$ | $A_4^{\#}$ | $A_5^{\#}$ | $A_6^{\#}$ | $A_7^{\#}$ |
| 1100 | $B_0$ | $B_1$ | $B_2$ | $B_3$ | $B_4$ | $B_5$ | $B_6$ | $B_7$ |
| 1101 | | | | | | | | |
| 1110 | | | | | | | | |
| 1111 | | | | | | | | |

FIG. 13

| | U2 | U1 | L2 | L1 | |
|---|---|---|---|---|---|
| r3 𝅘𝅥𝅯 | | | 0 0 0 0 | 0 0 0 1 | NORMAL TONE DURATION |
| r3 𝅘𝅥𝅯 | | | 0 0 0 0 | 0 0 1 0 | |
| 𝅘𝅥𝅯 | | | 0 0 0 0 | 0 0 1 1 | |
| r3 𝅘𝅥𝅰 | | | 0 0 0 0 | 0 1 0 0 | |
| 𝅘𝅥𝅰 | | | 0 0 0 0 | 0 1 1 0 | |
| r3 𝅘𝅥𝅱 | | | 0 0 0 0 | 1 0 0 0 | |
| 𝅘𝅥𝅱. | | | 0 0 0 0 | 1 0 0 1 | |
| 𝅘𝅥𝅱 | | | 0 0 0 0 | 1 1 0 0 | |
| 𝅘𝅥𝅱. | | | 0 0 0 1 | 0 0 1 0 | |
| 𝅘𝅥 | | | 0 0 0 1 | 1 0 0 0 | |
| 𝅘𝅥. | | | 0 0 1 0 | 0 1 0 0 | |
| 𝅗𝅥 | | | 0 0 1 1 | 0 0 0 0 | |
| 𝅗𝅥. | | | 0 1 0 0 | 1 0 0 0 | |
| 𝅝 | | | 0 1 1 0 | 0 0 0 0 | |
| 𝅝. | | | 1 0 0 1 | 0 0 0 0 | |
| 2X 𝅝 | | | 1 1 0 0 | 0 0 0 0 | |
| 3X 𝅝 | 0 0 0 0 | 0 0 0 1 | 0 0 1 0 | 0 0 0 0 | DOUBLE DURATION |
| 4X 𝅝 | 0 0 0 0 | 0 0 0 1 | 1 0 0 0 | 0 0 0 0 | |
| 6X 𝅝 | 0 0 0 0 | 0 0 1 0 | 0 1 0 0 | 0 0 0 0 | |
| 8X 𝅝 | 0 0 0 0 | 0 0 1 1 | 0 0 0 0 | 0 0 0 0 | |
| 12X 𝅝 | 0 0 0 0 | 0 1 0 0 | 1 0 0 0 | 0 0 0 0 | |
| 16X 𝅝 | 0 0 0 0 | 0 1 1 0 | 0 0 0 0 | 0 0 0 0 | |
| 24X 𝅝 | 0 0 0 0 | 1 0 0 1 | 0 0 0 0 | 0 0 0 0 | |
| 32X 𝅝 | 0 0 0 0 | 1 1 0 0 | 0 0 0 0 | 0 0 0 0 | |
| 48X 𝅝 | 0 0 0 1 | 0 0 1 0 | 0 0 0 0 | 0 0 0 0 | |
| 64X 𝅝 | 0 0 0 1 | 1 0 0 0 | 0 0 0 0 | 0 0 0 0 | |
| 96X 𝅝 | 0 0 1 0 | 0 1 0 0 | 0 0 0 0 | 0 0 0 0 | |
| 128X 𝅝 | 0 0 1 1 | 0 0 0 0 | 0 0 0 0 | 0 0 0 0 | |
| 192X 𝅝 | 0 1 0 0 | 1 0 0 0 | 0 0 0 0 | 0 0 0 0 | |
| 256X 𝅝 | 0 1 1 0 | 0 0 0 0 | 0 0 0 0 | 0 0 0 0 | |
| 324X 𝅝 | 1 0 0 1 | 0 0 0 0 | 0 0 0 0 | 0 0 0 0 | |
| 512X 𝅝 | 1 1 0 0 | 0 0 0 0 | 0 0 0 0 | 0 0 0 0 | |

FIG. 14

| L \ U | (16) 0000 | | (2) 0010 | | (4) 0100 | | (8) 1000 | |
|---|---|---|---|---|---|---|---|---|
| (16) 0000 | 16/16 | | | | | | | |
| (1) 0001 | | | | | | | | |
| (2) 0010 | | | 2/2 | | 2/4 | | | |
| (3) 0011 | | | 3/2 | | 3/4 | | 3/8 | |
| (4) 0100 | 4/16 | | | | 4/4 | | | |
| (5) 0101 | | | | | | | | |
| (6) 0110 | | | | | 6/4 | | 6/8 | |
| (7) 0111 | | | | | | | | |
| (8) 1000 | | | | | | | | |
| (9) 1001 | | | | | | | | |
| (10) 1010 | | | | | | | | |
| (11) 1011 | | | | | | | | |
| (12) 1100 | | | | | | | 12/8 | |
| (13) 1101 | | | | | | | | |
| (14) 1110 | | | | | | | | |
| (15) 1111 | | | | | | | | |

FIG. 15

| | MAJOR | | DORIAN MODE | | MINOR | | | |
|---|---|---|---|---|---|---|---|---|
| L \ U | 0000 | 0001 | 0010 | 1011 | 1010 | 1011 | | |
| 0000 | | | | | | | | |
| 0001 | C | | D | | A | | | |
| 0010 | $D^b$ | $C^\#$ | $E^b$ | $D^\#$ | $B^b$ | $A^\#$ | | |
| 0011 | D | | E | | B | | | |
| 0100 | $E^b$ | $D^\#$ | F | | C | | | |
| 0101 | E | | $G^b$ | $F^\#$ | $D^b$ | $C^\#$ | | |
| 0110 | F | | G | | D | | | |
| 0111 | $G^b$ | $F^\#$ | $A^b$ | $G^\#$ | $E^b$ | $D^\#$ | | |
| 1000 | G | | A | | E | | | |
| 1001 | $A^b$ | $G^\#$ | $B^b$ | $A^\#$ | F | | | |
| 1010 | A | | B | | $G^b$ | $F^\#$ | | |
| 1011 | $B^b$ | $A^\#$ | C | | G | | | |
| 1100 | B | | $D^b$ | $C^\#$ | $A^b$ | $G^\#$ | | |
| 1101 | | | | | | | | |
| 1110 | | | | | | | | |
| 1111 | | | | | | | | |

FIG. 16

X=0:ON
X=1:OFF

| SC \ OC | X000 | X001 | X010 | X011 | X100 | X101 | X110 | X111 |
|---|---|---|---|---|---|---|---|---|
| 0000 | 3 | 51 | 99 | 147 | 195 | 243 | 291 | 339 |
| 0001 | 6 | 54 | 102 | 150 | 198 | 246 | 294 | 342 |
| 0010 | 9 | 57 | 105 | 153 | 201 | 249 | 297 | 345 |
| 0011 | 12 | 60 | 108 | 156 | 204 | 252 | 300 | 348 |
| 0100 | 15 | 63 | 111 | 159 | 207 | 255 | 303 | 351 |
| 0101 | 18 | 66 | 114 | 162 | 210 | 258 | 306 | 354 |
| 0110 | 21 | 69 | 117 | 165 | 213 | 261 | 309 | 357 |
| 0111 | 24 | 72 | 120 | 168 | 216 | 264 | 312 | 360 |
| 1000 | 27 | 75 | 123 | 171 | 219 | 267 | 315 | 363 |
| 1001 | 30 | 78 | 126 | 174 | 222 | 270 | 318 | 366 |
| 1010 | 33 | 81 | 129 | 177 | 225 | 273 | 321 | 369 |
| 1011 | 36 | 84 | 132 | 180 | 228 | 276 | 324 | 372 |
| 1100 | 39 | 87 | 135 | 183 | 231 | 279 | 327 | 375 |
| 1101 | 42 | 90 | 138 | 186 | 234 | 282 | 330 | 378 |
| 1110 | 45 | 93 | 141 | 189 | 237 | 285 | 333 | 381 |
| 1111 | 48 | 96 | 144 | 192 | 240 | 288 | 336 | 384 |

AIR ON G STRING

FIG. 18A

| |
|---|
| REST(=0) |
| BAR |
| 4/4 |
| C |
| VIOLIN(ON) |
| DELAY VIB(ON) |
| E |
| E5 |
| A5 |
| ⋮ |
| A4 |
| 1 |
| G4 |
| 3 |
| 2 |
| G4 |
| ⋮ |
| C5 |
| VIOLIN(OFF) |
| DELAY VIB(OFF) |
| END |

FIG. 18B

| |
|---|
| REST(=0) |
| ORGAN(ON) |
| VIB(ON) |
| E |
| REST(17TIMES) |
| B4 |
| ⋮ |
| F4# |
| 1 |
| G4 |
| A4 |
| B4 |
| C5 |
| D5 |
| F5 |
| E5 |
| D5 |
| 3 |
| 2 |
| G4 |
| ⋮ |
| E4 |
| ORGAN(OFF) |
| DELAY VIB(OFF) |
| END |

FIG. 18C

| |
|---|
| REST(=0) |
| RESET |
| TEMPO(ON) |
| ROCK(ON) |
| E |
| C |
| B |
| ⋮ |
| D7 |
| 1 |
| G7 |
| 3 |
| 2 |
| G |
| ⋮ |
| C |
| FILL IN (ON) |
| REST(=0) |
| FILL IN(OFF) |
| C |
| ROCK(OFF) |
| N.C(1TIME) |
| ROCK(OFF) |
| END |

RHYTHM DISCRIMINATION (ROCK)

AUTO-PLAYING APPARATUS

Matter enclosed in heavy brackets [ ] appears in the original patent but forms no part of this reissue specification; matter printed in italics indicates the additions made by reissue.

*This application is a continuation of application Ser. No. 07/275,439 filed Nov. 23, 1988 and now abandoned which is a reissue of application Ser. No. 06/821,521 filed Jan. 23, 1986 and now U.S. Pat. No. 4,624,171 which is a continuation of application Ser. No. 06/597,168 filed Apr. 5, 1984 and now abandoned.*

[This application is a continuation, of application Ser. No. 597,168, filed Apr. 5, 1984.]

BACKGROUND OF THE INVENTION

The present invention relates to an auto-playing apparatus for reading out and playing musical pieces preset in a memory device such as a ROM or a RAM.

Recently, there has been made available an auto-playing apparatus, which can read out and automatically play musical data preset in an internal memory and which can also read out and automatically play musical data preset in an external memory. These auto-playing apparatuses meet the demand for automatically playing music. Particularly, the auto-playing apparatus which uses an external memory permits a variety of musical pieces to be enjoyed by the user simply changing the external memory for another. External memories, such as the so-called ROM packs may be used. The ROM packs, however, usually contain data for only a single musical piece. Therefore, it has been impossible to enjoy continuous playing of a number of different musical pieces without frequently changing ROM packs. Additionally, since in order to enjoy the automatic playing of several different musical pieces, the corresponding number of ROM packs must be purchased, the cost to the user is very high.

SUMMARY OF THE INVENTION

An object of the invention is to provide an auto-playing apparatus, which can read out and automatically play musical data for one or more pieces from one external memory.

According to one aspect of the invention, there is provided an auto-playing apparatus in which it is possible to designate the sequence of music pieces to be played automatically, by using music data stored in an external music pack.

According to another aspect of the invention, there is provided an auto-playing apparatus in which a keyboard is provided for use both to enable a manual performance and for designating the music pieces contained in the memory pack.

According to still another aspect of the invention, there is provided an auto-playing apparatus in which it is possible to designate randomly the sequence of music pieces to be played automatically.

According to a further aspect of the invention, there is provided an auto-playing apparatus in which an automatic performance can be realized either by use of a memory pack or a magnetic tape.

BRIEF DESCRIPTION OF THE DRAWINGS

FIG. 9A through 9G are views showing the formats of the ROM pack and magnetic tape data, and showing the ROM address, the main header, the musical data, the musical piece header, the melody line, the obligato line and the chord line, respectively;

FIGS. 10A through 10J are views showing various melody and obligato line data, with FIGS. 10A-1 and 10A-2 showing note data, FIG. 10B showing rest data, FIGS. 10C-1 and 10C-2 showing repeat data, FIGS. 10D-1 to 10D-3 showing timbre data, FIGS. 10E-1 to 10E-3 showing effect data, FIGS. 10F-1 to 10F-3 showing tie data, FIG. 10G showing time symbol data, FIG. 10H showing key symbol data, FIG. 10I showing bar data, and FIG. 10J showing end data;

FIGS. 11A to 11G show various chord line data, with FIG. 11A-1 to 11A-3 showing chord name data, FIGS. 11B-1 and 11B-2 showing rest data, FIGS. 11C-1 and 11C-2 showing repeat data, FIGS. 11D-1 to 11D-3 showing rhythm/fill-in/rhythm discrimination data, FIG. 11E showing tempo data, FIG. 11F showing counter reset data, and FIG. 11G showing end data;

FIG. 12 is a view showing note data;

FIG. 13 is a view showing tone duration data;

FIG. 14 is a view showing time symbol data;

FIG. 15 is a view showing key symbol data;

FIG. 16 is a view showing tempo data;

FIGS. 18A to 18C are views showing the melody, obligato and chord line data for the same music score;

DETAILED DESCRIPTION OF THE PREFERRED EMBODIMENT

Figure 1A:
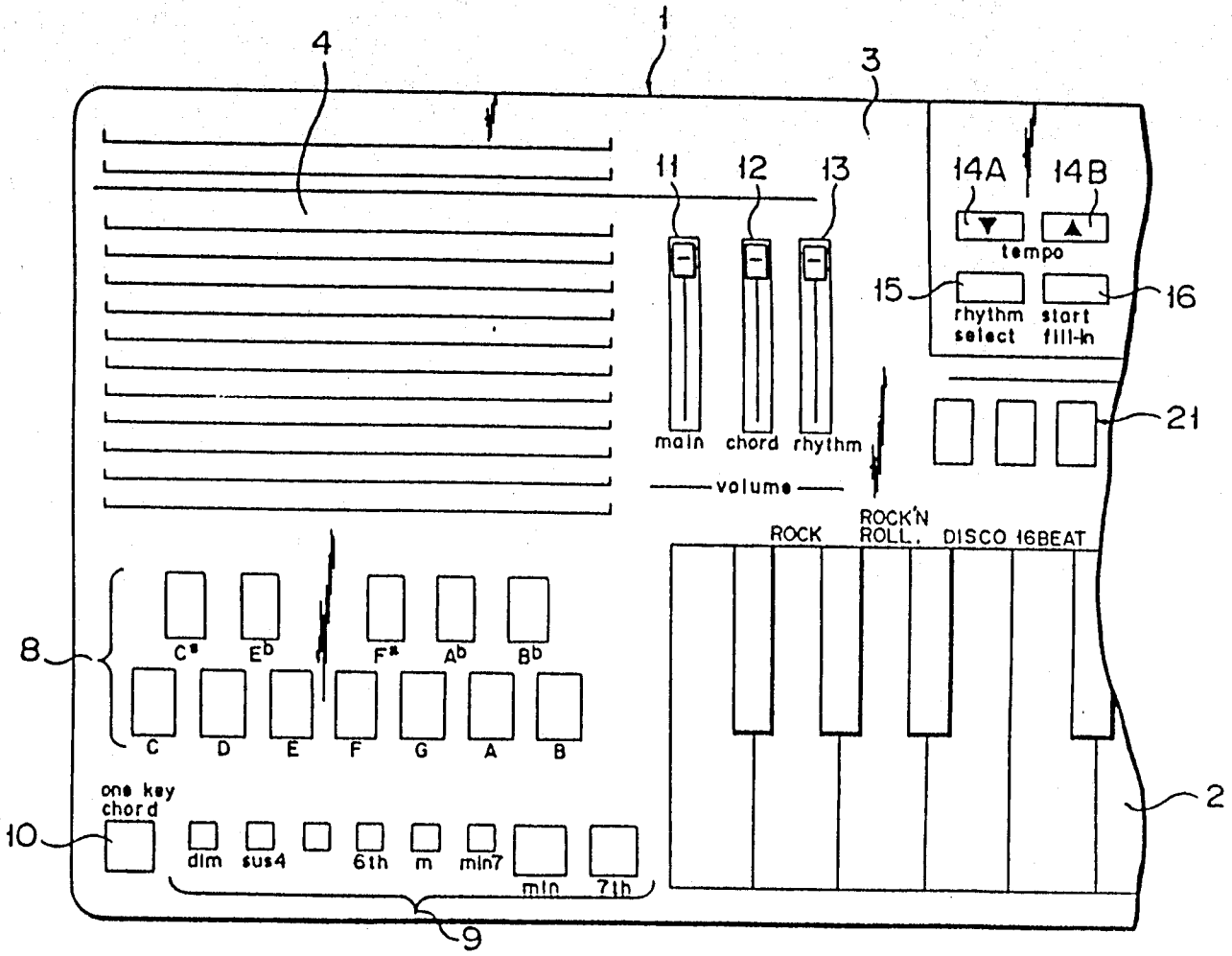
FIGS. 1A and 1B are a plan view showing an auto-playing apparatus incorporating an embodiment of the invention.
Figure 1B:
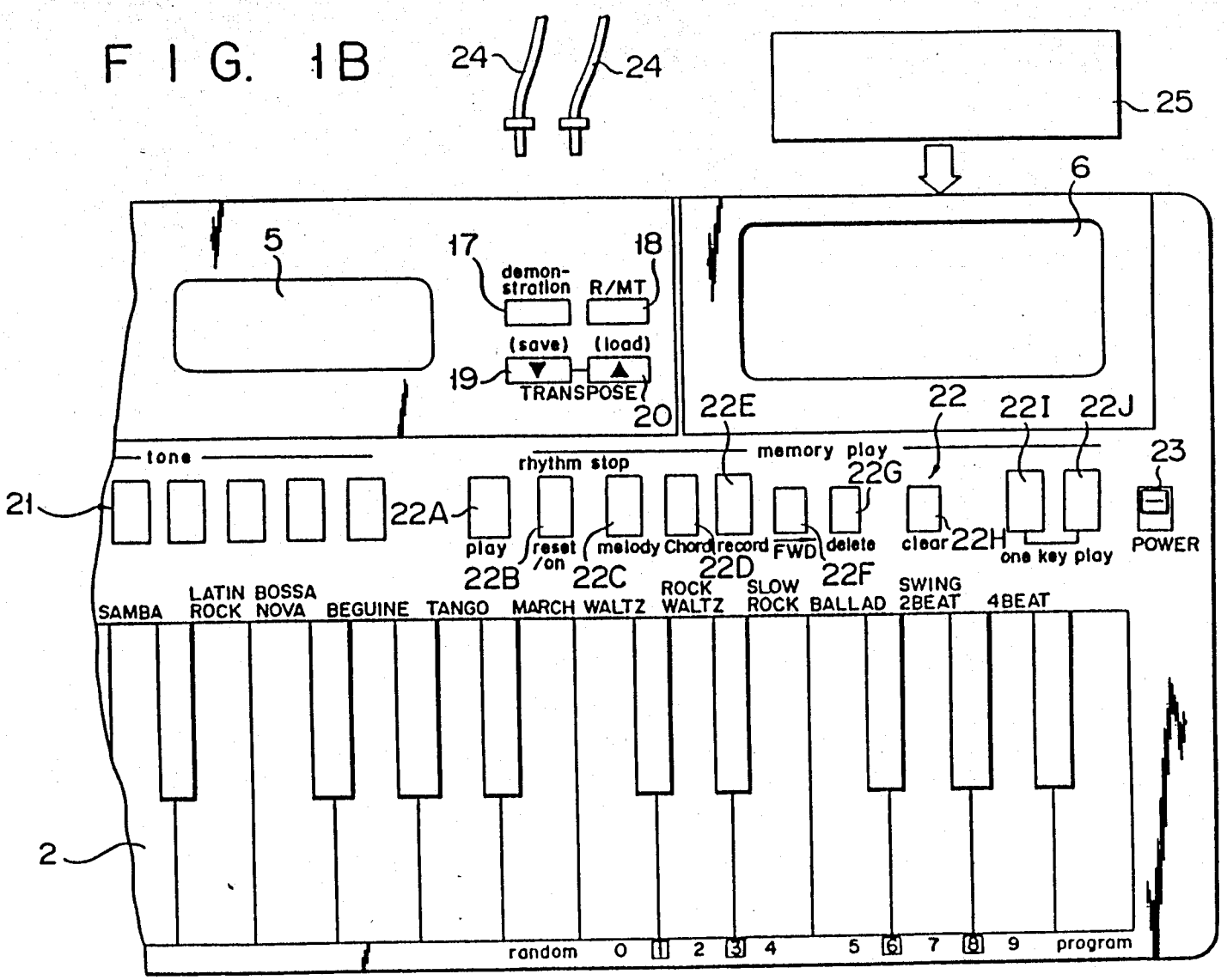
Figure 2:
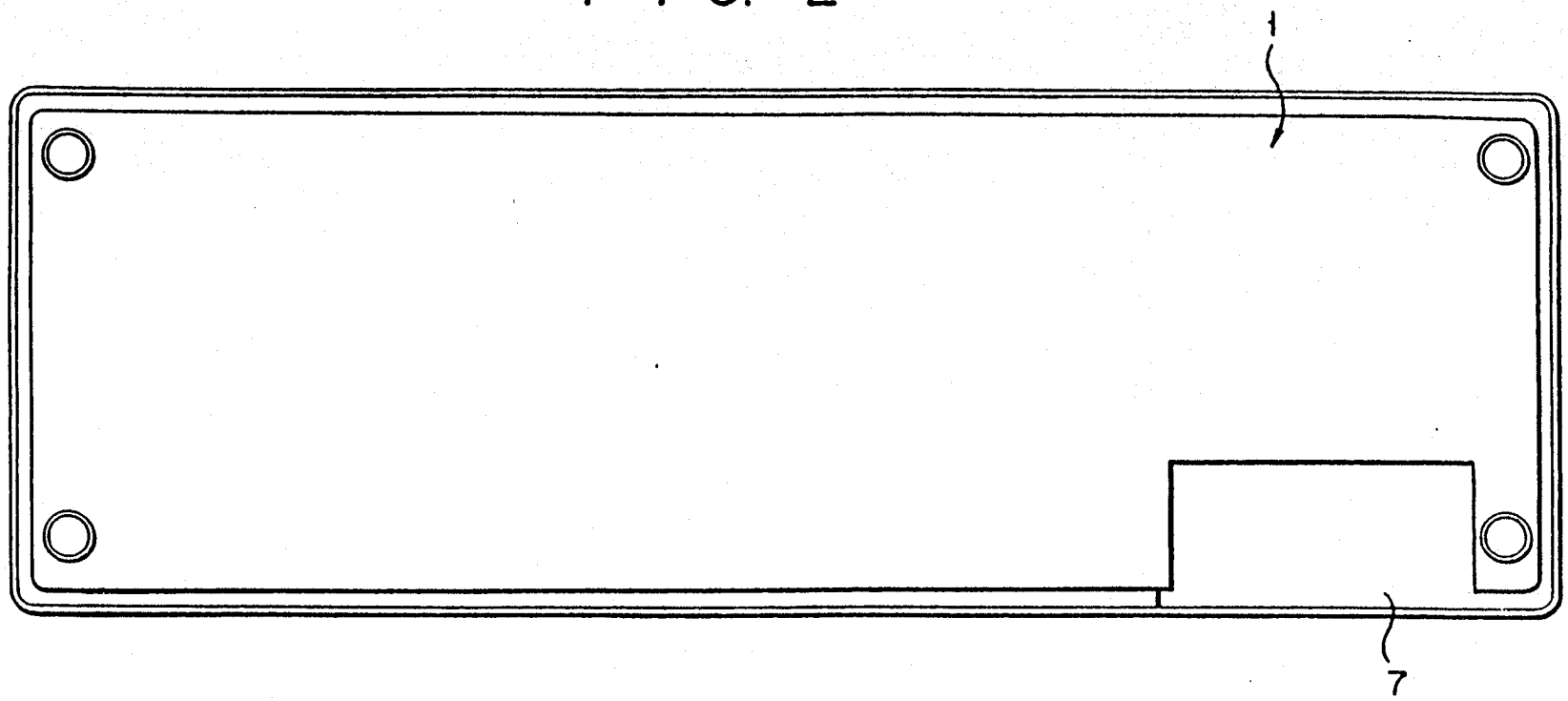
FIG. 2 is a bottom view of the same electronic musical instrument.

FIGS. 1A and 1B show a plan view of an electronic musical instrument. The top of the electronic musical instrument 1 has a keyboard 2, a switch section 3 having various switches, a sounding section 4, a display section 5 and a ROM (read only memory) pack setting section 6 for setting a ROM pack 25. The bottom of the instrument, as shown in FIG. 2, has an interface circuit setting section 7, to which data from a magnetic tape (not shown) is supplied. The body of the instrument accomodates various circuit components, a battery and a loudspeaker.

The keyboard 2 consists of 31 keys from $F_2$ to $B_4$, for instance, for the usual manual operation. Of these keys, 16 white keys from $G_2$ to $A_4$ also serve as rhythm designation switches for designating rhythms from rock to swing (4-beat). Further, 10 white and black keys from $C_4$ to $A_4$ also serve as numeral keys for indicating the sequence of the pieces stored in the ROM pack 25 or in the magnetic tape. This sequence may be input as a program or by random selection. For example, when the sequence is being programmed, $C_4$ key is used as a designating key, and when the music sequence is randomly designated, $B_3$ key is used as a designation key.

Switch groups 8 and 9 are provided to write data for the musical pieces and for the chords in an internal RAM to be described later. The switch group 8 designates the root, and the switch group 9 designates the chord. The pitch and tone duration of the musical data are input by operating the keyboard 2. A one-key chord key 10 is provided for reading out the preset chord data and for sounding out the chords one by one. Volume switches 11, 12 and 13 are provided for controlling the main volume, the chord volume and the rhythm volume, respectively. Tempo switches 14A and 14B are provided to speed up and to slow down the tempo. A rhythm select switch 15 must be operated before designating a rhythm by the 16 white keys noted above. The start/fill-in switch 16 starts the automatic playing of the rhythm after the rhythm has been designated.

The demonstration switch 17 is used to repeatedly and sequentially play the music pieces in the ROM pack. A R/MT switch 18 is used to select either the ROM pack or the magnetic tape depending on if it has been operated for an odd or even number of times.

Switches 19 and 20 are utilized as save and load switches for writing and reading music data, chord data etc. between the internal RAM and magnetic tape. These switches are also used to transpose a played piece. Keys which are assembled in a predetermined sequence are changed every time the switch 19 or 20 is operated. The key change can be reversed by the switches 19 and 20.

Tone switches 21 are provided to designate 8 different timbres such as piano or violin. Memory switches 22A to 22H are control switches which are used when writing musical data, etc. in the internal RAM. The play switch 22A is used to play-back. The switch 22B serves to stop rhythm, and to reset and release the internal RAM. The switch 22C writes melody data (musical data). The chord switch 22D writes chord data. The record switch 22E writes musical data, etc. in the internal RAM. The switch 22F increments the addresses one by one. The delete switch 22G deletes data written in the internal RAM. The clear switch 22H clears the address counter, etc. One-key play switches 22I and 22J are provided to read out the melody data of the internal RAM tone by tone for playing, and a power switch 23 is also shown. A cord 24 can connect with an interface circuit (not shown) in the interface circuit setting section 7 so that data can be transferred between the electronic musical instrument 1 and a magnetic tape inside a tape recorder (not shown) that is separate from the instrument 1.

Figure 3:
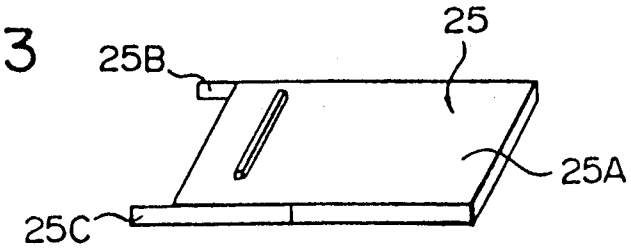
FIG. 3 is a perspective view showing a ROM pack.

FIG. 3 is a perspective view of the ROM pack 25. It comprises a plastic case 25A which accommodates a printed circuit board having an LSI (large scale integrated circuit) containing written musical data for predetermined musical pieces, and a battery, etc. Terminals 25B and 25C are connected to a connector in the ROM pack setting section 6. The plastic case 25A of the ROM pack 25 is labeled with the names of musical pieces contained therein.

Figure 4:
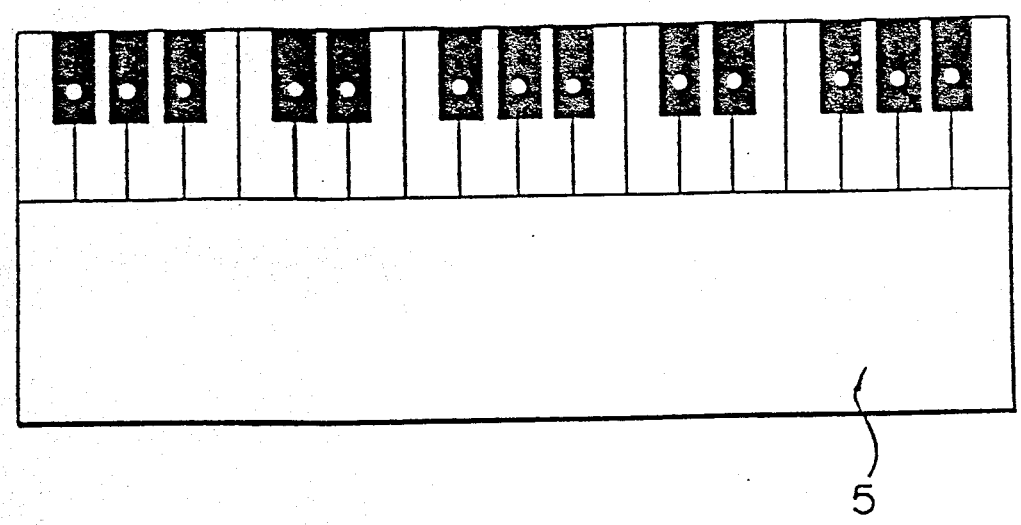
FIG. 4 is a plan view showing a display section when power is off.
Figure 5:
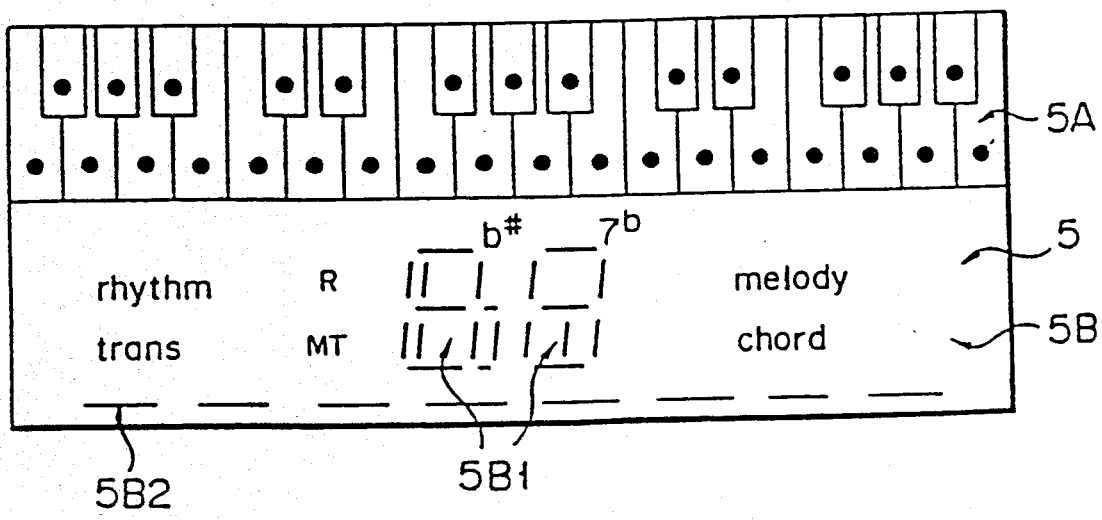
FIG. 5 is a view showing an electrode arrangement of a liquid crystal panel in the display section.

FIG. 4 is a plane view showing the display section 5 when the power is off. The display section 5 includes a liquid crystal display panel. FIG. 5 shows the electrode structure of the liquid crystal display panel. It consists of an upper keyboard display section 5A and a lower letter display section 5B. In the keyboard display section 5A, the white and black keys are displayed by liquid crystal having different colors. Shown as black dots on the individual keys are display points which are turned on when the corresponding keys are operated to indicate the pitch of the tone being used when the instrument is played manually or automatically. The letter display section 5B has a display symbol "rhythm" which is turned on when rhythm is played, a display symbol "trans" which is turned on during transposition, a display symbol "R" which is turned on when the ROM pack 25 is used for automatically playing, a display symbol "MT" which is turned on when the magnetic tape is used for automatically playing, display elements 5B1 for displaying numerals and chord, a display symbol "melody" which is turned on when writing melody data, a display symbol "chord" which is turned on when writing chord data, and bar display elements 5B2 which provide 8 different timbres and which are turned on when a corresponding timbre has been designated.

Figure 6:
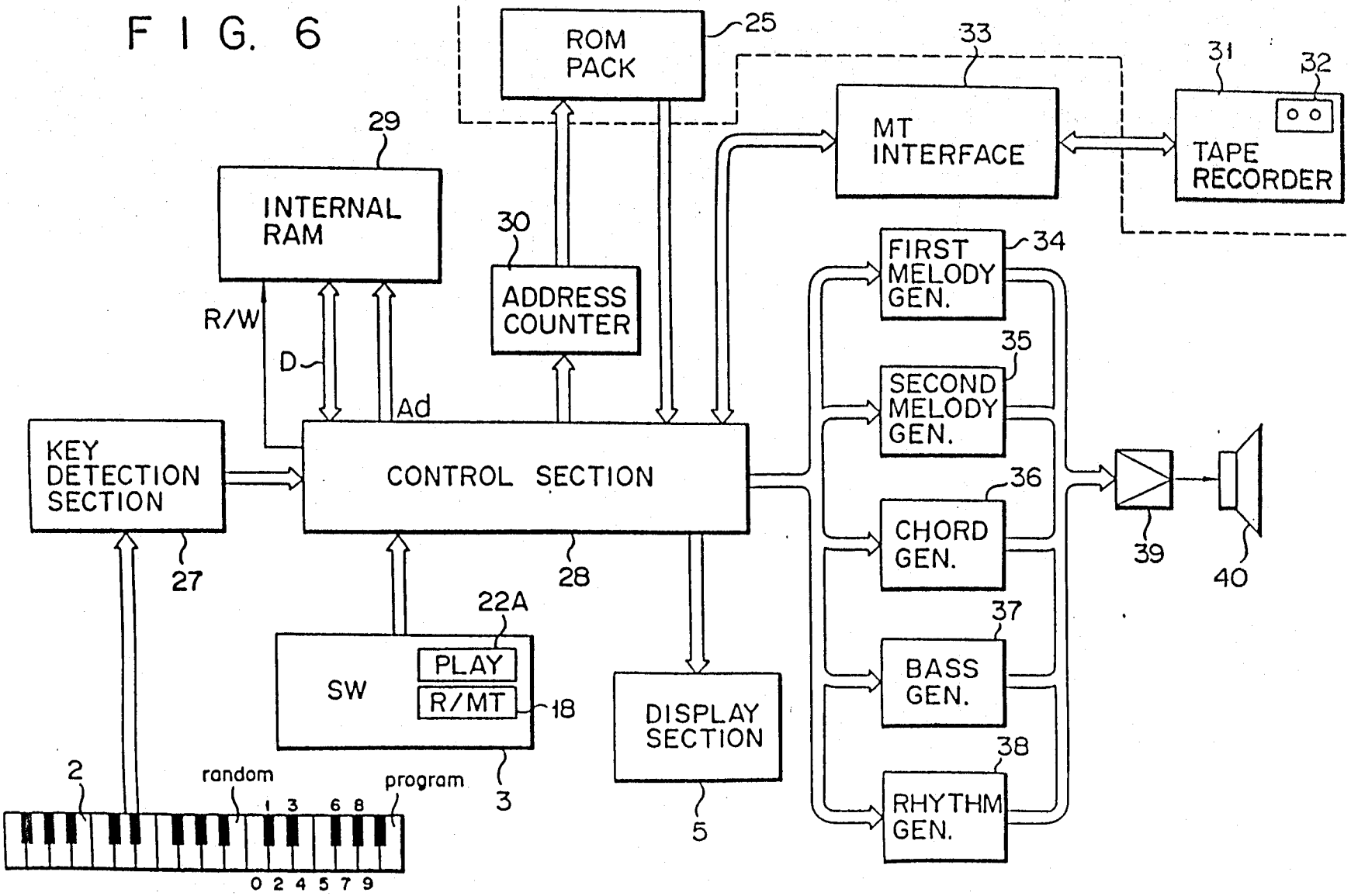
FIG. 6 is a block diagram showing a circuit of the electronic musical instrument.

The circuitry of the electronic musical instrument will now be described with reference to FIGS. 6 and 7. Referring to FIG. 6. each key output on the keyboard 2 is coupled to a key detection section 27, which produces a key code when the key is operated. The key code is fed to a control section 28. Outputs from various switches on the switch section 3 are also fed to the control section 28. The control section 28 includes a microprocessor, etc. and controls the entire operation of the electronic musical instrument. More specifically, it provides a read/write control signal R/W to the internal RAM 29 to control its operation to write and to read data D such as musical data. At the same time, the control section 28 also provides address data Ad. For the ROM pack 25, the control section 28 first presets the first address of the musical piece data to be read out in an address counter 30, and then it reads the piece data while incrementing the address counter 30. If further reads out musical piece data from a magnetic tape 32 in a tape recorder 31 through an MT interface 33. For the manual operation of the keyboard or for the automatic operation with the ROM pack 25 and the tape recorder 31, the control section 28 feeds the necessary data for each function to a first melody generator 34, a second melody generator 35, a chord generator 36, a bass generator 37 and a rhythm generator 38. The first melody generator 34 generates melody data for a melody line to be described later. The second melody generator 35 generates melody data for an obligate line. The chord generator 36 generates chord data for a chord line. The base generator 37 generates base data, and the rhythm generator 38 generates rhythm data. These data are fed through an amplifier 39 and a loudspeaker 40 to the sounding section 4.

The control section 28 further controls the display operation of the display section 5.

Figure 7:
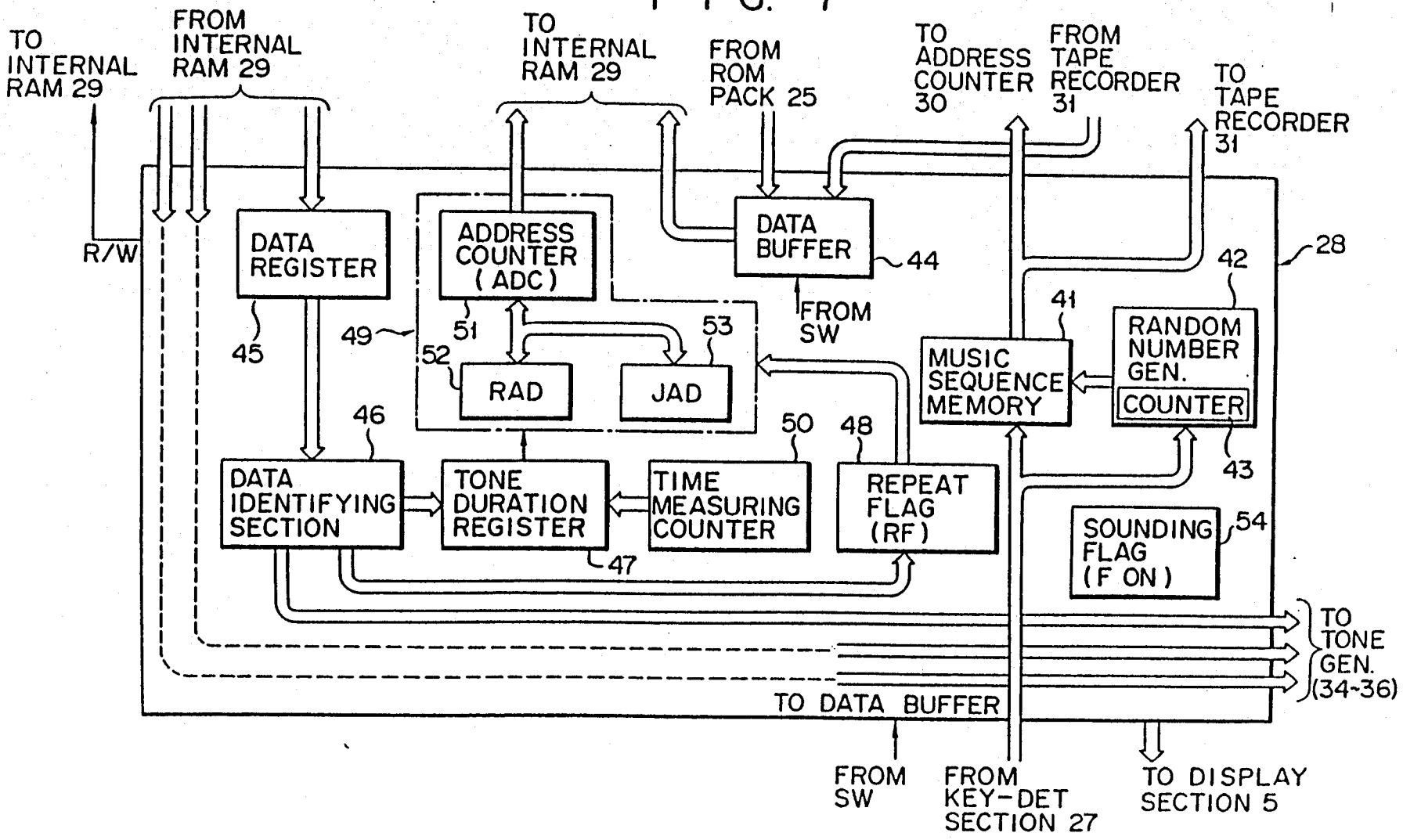
FIG. 7 is a block diagram showing a control section 28 in the circuit shown in FIG. 6.

FIG. 7 shows the construction of the circuit essential to the control section 28. When a program specifies a number of pieces that use the 12 keys from $B_3$ to $B_4$ on the keyboard 2. piece sequence data is directly and sequentially fed into the musical sequence memory 41 for storage. When a number of pieces are to be played randomly, data is preset in the counter 43 of the random number generator 42. Every time the random number generator 42 generates a random number data, the data is written as piece sequence data in the musical sequence memory 41. At the same time, the counter 43 correspondingly decreases. When the count becomes 0 the generation of random numbers is stopped. The musical sequence data in the musical sequence memory 41 is then fed either to the ROM pack 25 or to the tape recorder 31. After the play switch 22A is operated, musical data for one piece of music is sequentially read out and transferred through a data buffer 44 to the internal RAM 29.

A data register 45 is provided to store data for the melody line among the data read out from the ROM pack 25 or magnetic tape 32. Data input to the data register 45 is the transferred to a data identifying section 46. If the input data is tone duration data, the data identifying section 46 will set it in the tone duration register 47. If it is repeat flag data, the section 46 will feed it to a 2-bit repeat flag (RF) register 48, and thence to an address control section 49. If the data input to the data identifying section 46 is any other type of data, e.g., pinch, timbre, effect, etc., it is fed to the first melody generator 34.

A time measuring counter (timer) 50 feeds time count data to the tone duration register 47. The tone duration data in the tone duration register 47 is decreased by 1 every time the time count data is changed to correspond to a predetermined unit of time. When the tone duration data becomes 0, a one-shot signal is fed to the address control section 49. As will be described later, the tone duration data consists of ON-duration data (when the tone is audible) and OFF-duration data (when no tone is audible).

The address control section 49 includes an address counter (ADC) 51, a return address register (RAD) 52, and a jump address register (JAD) 53. When automatic playing begins, the first address of the piece is preset in the address counter 51 which is progressively incremented as the playing progresses. To change the address for the repeat function, data is transferred according to repeat flag data between the return address register 52 and the jump address register 53, and the address register 51. The address data provided from the address counter 51 is supplied to the internal RAM 29 for reading the next data. The data register 45, data identifying section 46, tone duration register 47, time measuring counter 50, repeat flag register 48 and address control section 49 are shown only for the data from the melody line. Although not shown, the same circuit can be provided for data from the obligato line, or that from the chord line.

An ON flag (F ON) register 54 is a one-bit register in which "1" is set while the tone is on and "0" is set while it is off. The same ON flag register is also provided for the obligato line and chord line data although they are not shown.

Figure 8A:
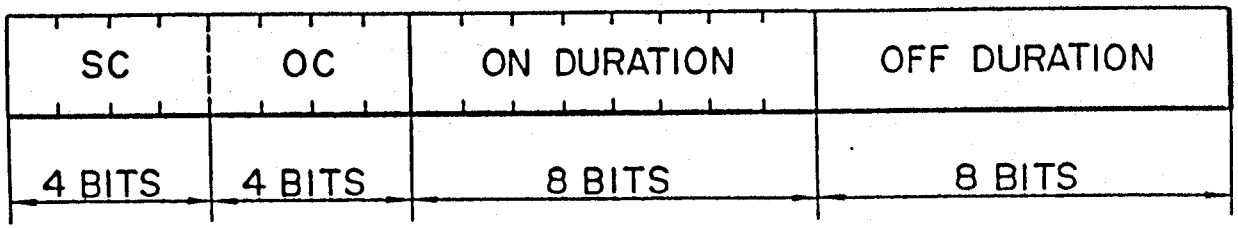
FIG. 8A is a view showing the format of the melody and the obligato line data.
Figure 8B:
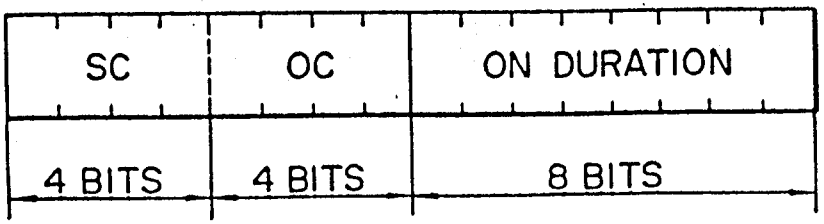
FIG. 8B is a view showing the format of the chord line data.

FIG. 8A shows the format of the melody and obligato line tone data for a tone stored in the ROM pack 25 or on the magnetic tape 32. The format consists of a total of 6 digits, including a 4-bit note code (SC), a 4-bit octave code (OC), an 8-bit ON-duration code and an 8-bit OFF-duration code. This format is also used for rest data. FIG. 8B shows the format for chord line tone data. It consists of a total of 4 digits, including a 4-bit note code (SC) indicative of the name of the root, a 4-bit octave code (OC) indicative of the kind of chord used, and an 8-bit ON-duration code. FIG. 12 shows specific examples of the note code (SC) and octave code (OC). Notes $F_3$ to B5 are used for the note code and octave code for the melody line, and notes $F_3$ to $B_5$ are used for those in the obligato line. FIG. 13 shows examples of data representing ON and OFF duration. The tone duration data is largely classified into normal tone duration data having small values or into double duration data having larger values. Normal tone duration is expressed as 8-bit data. Its upper 4 bits are designated at $L_2$, and its lower 4 bits are designated at $L_1$. The scope of tone duration covers 16 different tone durations from a triplet of sixty-fourth notes to a dotted whole note. The double duration data includes upper 8-bit data in addition to the 8-bit data $L_2$ and $L_1$ noted above. Of the additional 8-bit data, the upper 4 bits are designated at $U_1$, and the lower 4 bits are designated at $U_2$. The double tone duration covers 16 different durations from twice to 512 times the whole note.

Thus in this embodiment, a total of 32 different tone durations are used.

Figure 9A:
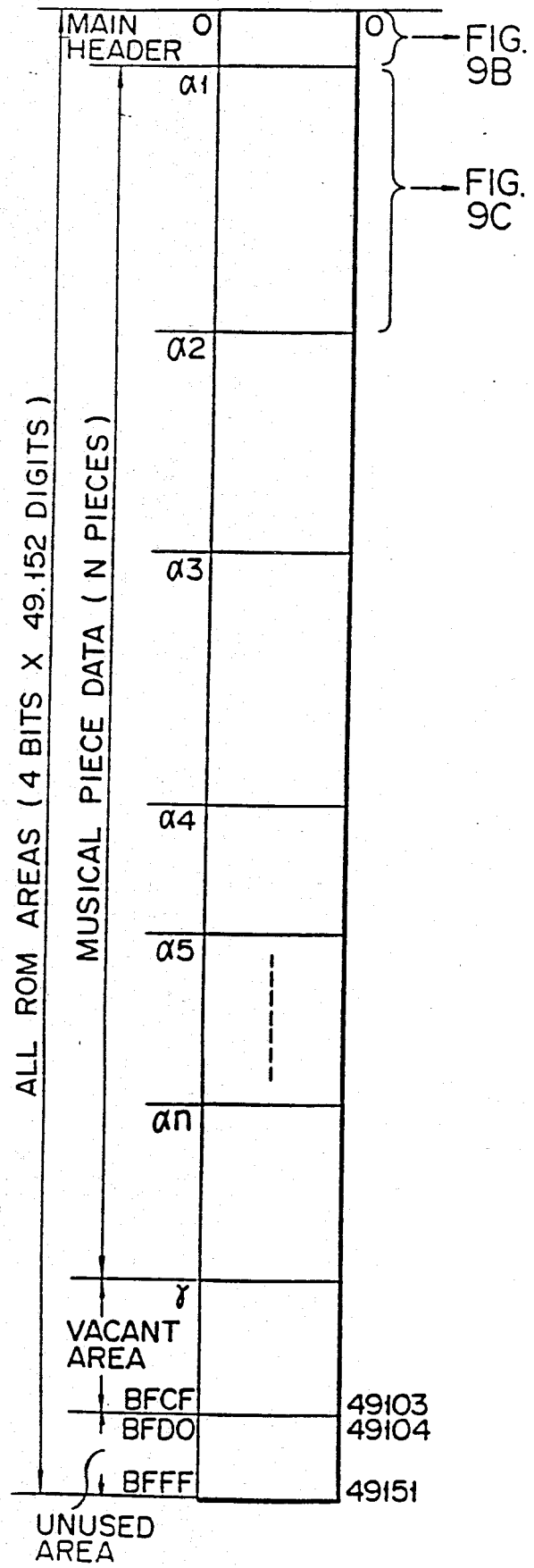

FIGS. 9A to 9G show data formats adopted for the ROM pack 25. More specifically, FIG. 9A shows the overall data format. It comprises a main header (having addresses 0 to $\alpha_1$-1), musical pieces data areas for n musical pieces (with addresses $\alpha_1$ to $\gamma_1$-1, the first addresses for the individual pieces being $\alpha_1, \alpha_2, \ldots, \alpha_n$, n being an integral number), and vacant areas (with addresses $\gamma$ to BFCF), unused areas (BFDO to BFFF). The total storage capacity is 4 bits by 49,152 digits.

Figure 9B:
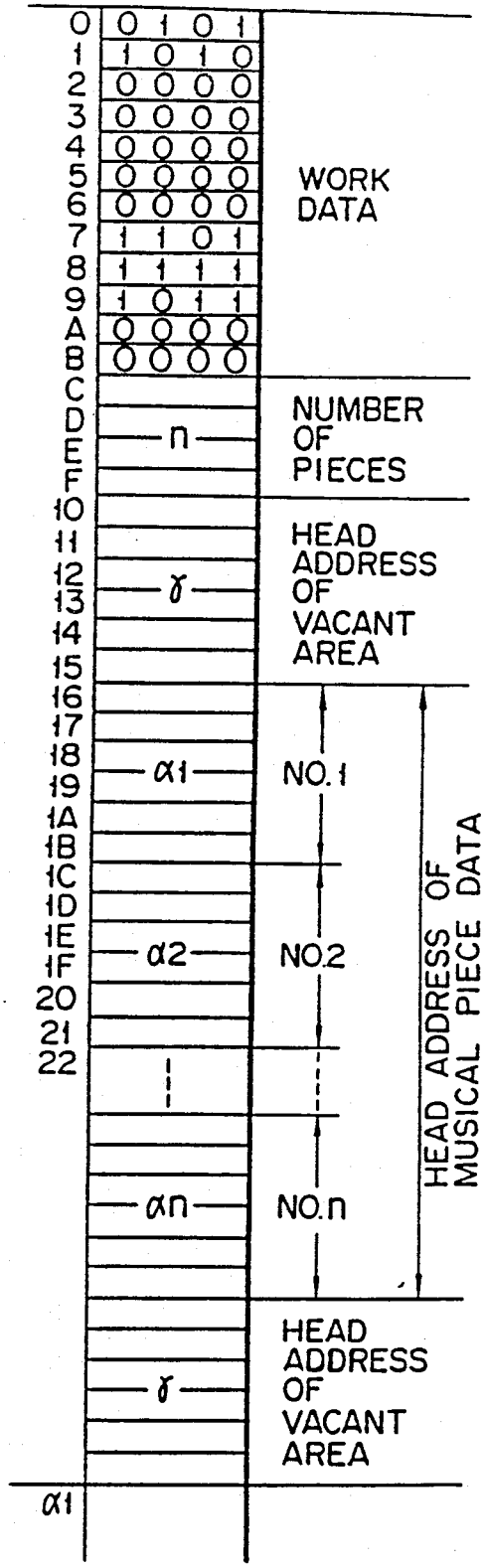

FIG. 9B shows the data format of the main header. The head 11-digit area is for writing work data as shown. The next 4-digit area is for writing the number n of pieces. The next 6-digit area is for writing the head address of the vacant area. The next individual 6-digit areas are for writing the head addresses of the pieces from No. 1 to No. n. The next 6-digit area is for writing the head address of the vacant area.

Figure 9C:
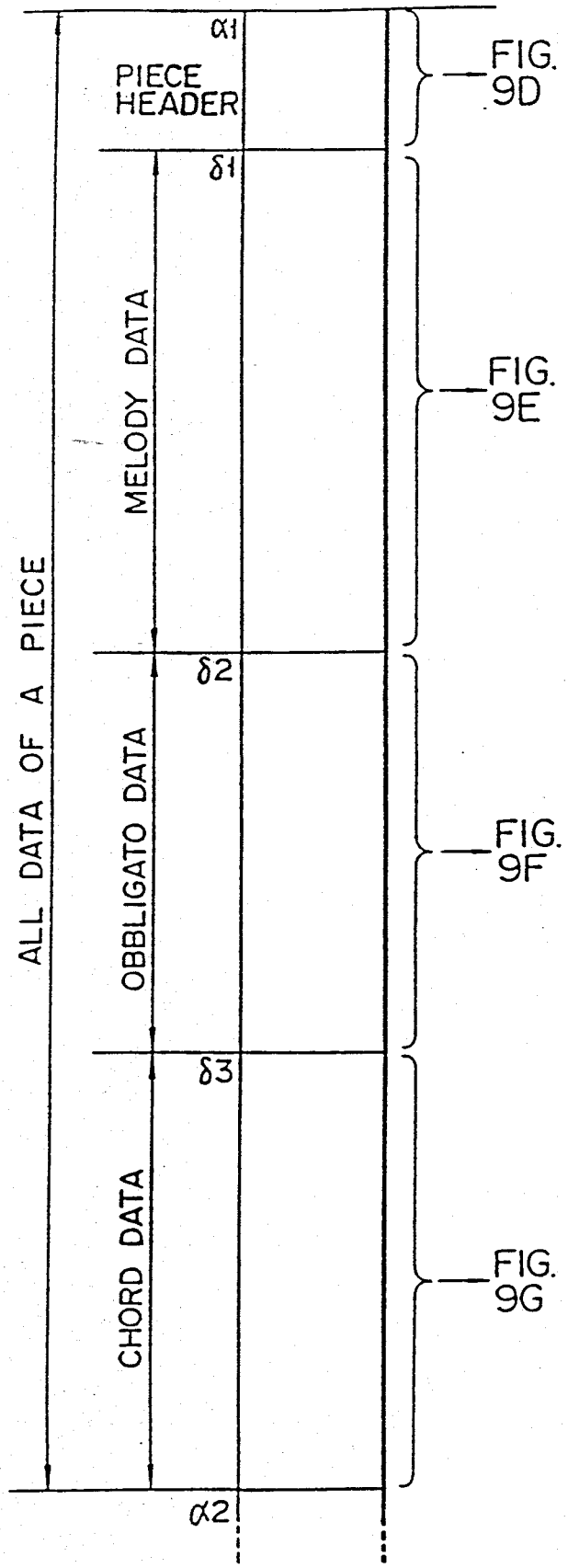

FIG. 9C shows the data format of each musical piece data area. Here, the typical musical piece data of the first piece (No. 1) is shown. It comprises from the head thereof a piece header, melody data, obligato data and chord data. Symbols $\delta_1$, $\delta_2$ and $\delta_3$ represent the initial addresses of the melody data, obligato data and chord data, respectively.

Figure 9D:
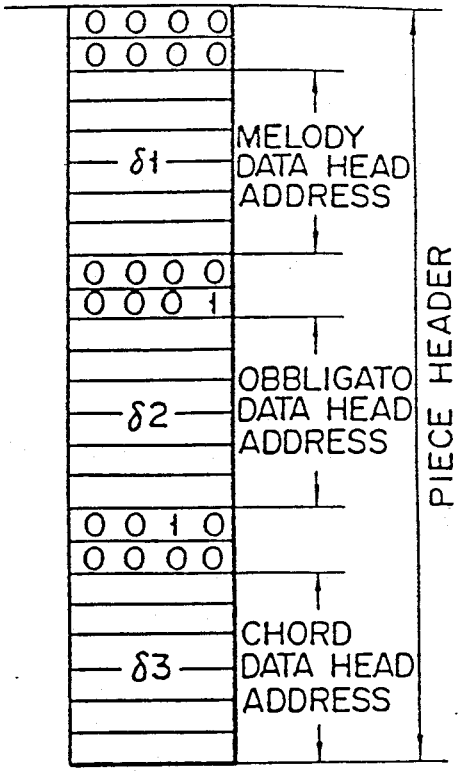

FIG. 9D shows the data format of the piece header. The head 2-digit area is for writing all "0" data. The next 6-digit area is for writing the melody data head address $\delta_1$. The next 2-digit area is a 2-digit gap. The next 6-digit area is for writing the obligato data head address $\delta_2$. The next 2-digit area is a 2-digit gap. The next 6-digit area is for writing the chord data head address $\delta_3$.

FIG. 9E shows the data format of the melody line data. The head data area is for a rest (the duration being 0). Then, bar data, time data, key data and timbre ON data are written. After that, if there is an effect ON in the music score, its data is written. Then the note data of the music score is written. Then the timbre OFF data and effect OFF data, if any, are written along with the end data.

FIG. 9F shows the data format of the obligato line data. The head data area is for a rest (the duration being 0). Then timbre ON data and effect ON data, if any, are written. Then the note data on the music score, the timbre OFF data, effect OFF data and END data are written, respectively.

FIG. 9G shows the data format of chord line data. The head data area is for a rest (the duration being 0). Then, the counter reset data is written. The counter is provided in the rhythm generator 38 shown in FIG. 6 and counts the time of the rhythm being generated. Subsequent to the counter reset data, rhythm discrimination data, tempo ON data, rest data and rhythm ON data are written. Then the individual chord data depending on the music score, the rhythm OFF data, the tempo OFF data and the END data are written.

Figures 1, 2, 10C:
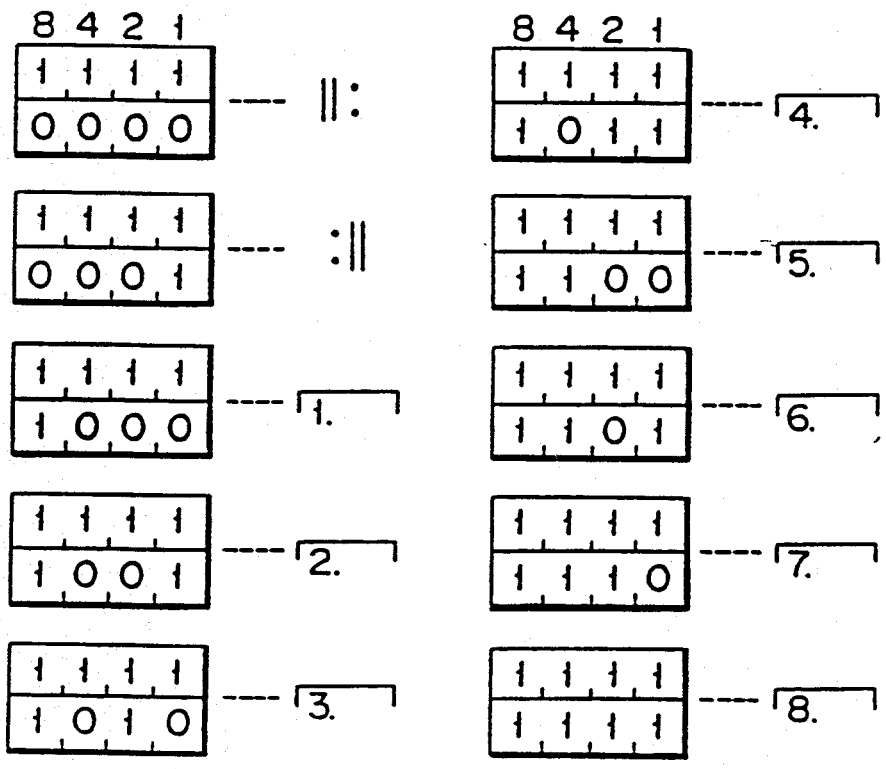

FIGS. 10A through 10J show examples of the various data described above used as the melody and obligato line data. More specifically, FIGS. 10A-1 and 10A-2 show note data. FIG. 10A-1 shows normal tone duration data in which the tone duration is shorter than triplet of thirty-second notes. It comprises 2-digit pitch data consisting of a note code (SC) and an octave code (OC), 2-digit tone duration data $L_1$, $L_2$ representing the ON duration, and 2-digit rest duration data $L_1$, $L_2$ representing the OFF duration.

FIG. 10A-2 shows double duration data, in which the tone duration is equal to or longer than a triplet of thirty-second notes. It comprises: the pitch data SC, OC; tone duration data $L_1$, $L_2$; rest duration data $L_1$, $L_2$; 2-digit double duration command data; upper bit tone duration data (2 digits) $u_1$, $u_2$; and rest duration data (2 digits) $u_1$, $u_2$.

FIG. 10B shows the rest data. The rest is shorter than a triplet of thirty-second notes and is provided at the head of the melody and obligato line data (the rest duration being 0 in this case). It is also used when there is a rest immediately after the repeat data to be described layer. It comprises rest duration command (2 digits) and rest duration data (2 digits).

FIGS. 10C-1 and 10C-2 show a specific example of the repeat data. FIG. 10C-1 shows its configuration. It comprises repeat command data (2 digits, to be described later) and no chord data (4 digits). FIG. 10C-2 shows 10 different examples of the repeat command.

FIGS. 10D-1 to 10D-3 show examples of timbre data. FIG. 10D-1 shows timbre ON and OFF data which is less than a triplet of thirty-second notes. Each data consists of timbre command data (2 digits), timbre data (2 digits) to be described later, and rest duration data $L_1$ and $L_2$ (2 digits) representing a rest lasting for at least one time. Mark x indicates variable data. FIG. 10D-2 shows timbre ON and OFF data in which the time is 32/3 or greater. Each data consists of: timbre command data; timbre data; rest duration data (lower bit data) $L_1$, $L_2$; double duration command data (2 digits); no chord data (2 digits); and 2-digit rest duration data u1, u2 (upper bit data). FIG. 10D-3 shows 8 different timbre data for piano, etc.

FIGS. 10E-1 to 10E-3 show examples of effect data. FIG. 10E-1 shows effect ON and OFF data which is less than a triplet of thirty-second notes. Each data consists of effect command data (2 digits), effect data (2 digits) to be described later and rest duration data (2 digits) $L_1$ and $L_2$. FIG. 10E-2 shows data which is larger than a triplet of thirty-second notes. In this case, each data consists of: effect command data; effect data; rest duration data (lower bit data) $L_1$, $L_2$; double duration command data (2 digits); no-chord data (2 digits); and rest duration data (uppper bit data) $u_1$, $u_2$. FIG. 10E-3 shows three different examples of effect data (short sustain, vibrato and delay vibrato).

Figures 1, 2, 3, 10F, 10G, 10H, 10I, 10J:
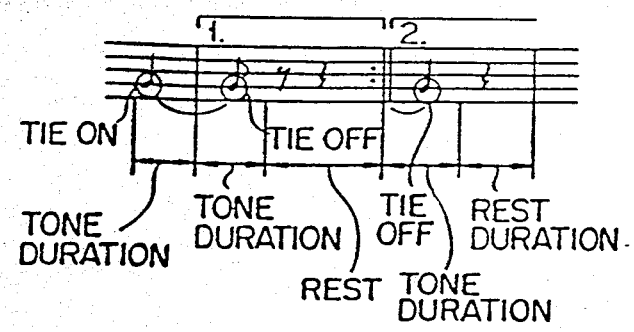

FIGS. 10F-1 to 10F-3 show examples of tie data. FIG. 10F-1 shows tie ON and OFF data. Each data consists of tie command data (2 digits) and no-chord data (4 digits). FIG. 10F-2 shows an example of a tie data as it appears in a musical score. Note data is inserted after the ON and OFF commands of the tie data. FIG. 10F-3 shows data representing the contents of the score shown in FIG. 10F-2.

FIG. 10G shows an example of time symbol data. It consists of: a time symbol command (2 digits); time symbol data (2 digit data) L, u to be described later; and no-chord data (2 digits). FIG. 14 shows the specific data of the time symbols L, u. The symbols L and u represent the numerator and denominator of the time.

FIG. 10H shows an example of key symbol data. It consists of: key symbol command data (2 digits); key symbols (2 digits) L, u to be described later; and no-chord data (2 digits). FIG. 15 shows a specific example of the key symbol L, u.

FIG. 10I shows an example of bar data. It consists of bar command data (2 digits) and no-chord (4 digits) data. It is provided at the head of the melody line data.

FIG. 10J shows an example of end data. It consists of 6 digits and is provided at the end of the melody and obligato line data.

FIGS. 11A-1 through 11G show examples of the various data noted for the chord line. FIGS. 11A-1 to 11A-3 show chord name data. FIG. 11A-1 shows chord name data when the duration of a nomal chord is less than a triplet of thirty-second notes. It consists of root data SC (to be described later), the chords name OC (to be described later), and 2-digit chord duration data $L_1$, $L_2$. FIG. 11A-2 shows chord name data when the duration is equal to or longer than a triplet of thirty-second notes. It consists of: root data SC; chord name data OC; 2-digit chord duration data (lower bit data) $L_1$, $L_2$; double duration command data (2 digits); and 2-digit chord duration data (upper bit data) $u_1$, $u_2$. FIG. 11A-3 shows examples of the chord name data. Sixteen different chord names are shown. In the figure, "off chord" means the sole bass sound, and "no chord" means the absence of any tone.

FIGS. 11B-1 and 11B-2 show examples of rest data. FIG. 11B-1 shows rest data when the normal duration is less than a triplet of thirty-second notes. It consists of rest command data (2 digits) and rest duration data (2 digits) $L_1$, $L_2$. FIG. 11B-2 shows rest data when the double duration is equal to or longer than a triplet of thirty-second notes. It consists of: rest command data; rest duration data (lower bit data) $L_1$, $L_2$; double duration command data (2 digits); and rest duration (2 digits) $u_1$, $u_2$. It is provided at the head of chord line data when the chord duration is 0. Because of the chord rest data, the previous chord is held. The rest data is further used when such data as repeat, rhythm and fill-in data are inserted between chords.

FIGS. 11C-1 and 11C-2 show an example of repeat data. FIG. 11C-1 shows the data structure. It consists of repeat command data (2 digits) to be described later and no-chord data (2 digits). FIG. 11C-2 shows examples of the repeat command. Ten different repeat commands are prepared as shown.

FIGS. 11D-1 to 11D-3 show rhythm/fill-in/rhythm discrimination data. FIG. 11D-1 shows its ON and OFF data structures. Each data consists of rhythm/fill-in/thythm discrimination command data (2 digits) and rhythm data (2 digits) to be described later. FIG. 11D-2 shows rhythm/fill-in command data. It consists of rhythm command data, fill-in command data, and thythm discrimination command data, each having 2 digits. FIG. 11D-3 shows 17 different kinds of rhythm data for rock, etc., having 2-digits.

FIG. 11E shows the ON and OFF data of the tempo data. Each data consists of tempo command data (2 digits) and tempo data (2 digits) to be described later. FIG. 16 shows specific tempo data. The bit shown as symbol x represents ON tempo data as "0" and OFF tempo data as "0".

FIG. 11F shows counter reset data. It consists of 4 digits.

FIG. 11G shows end data. It consists of 4 digits, and is provided at the end of the chord line data.

Figure 17A:
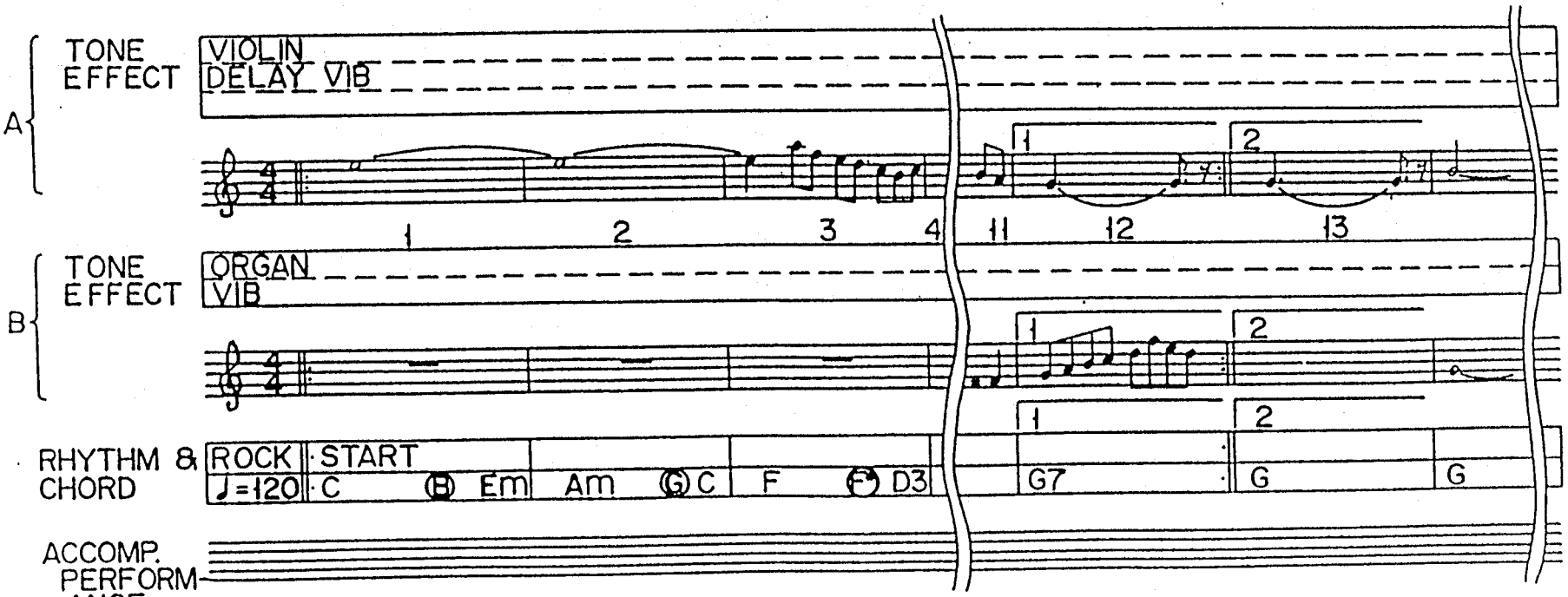
FIGS. 17 and 17B show an example of a music score.
Figure 17B:
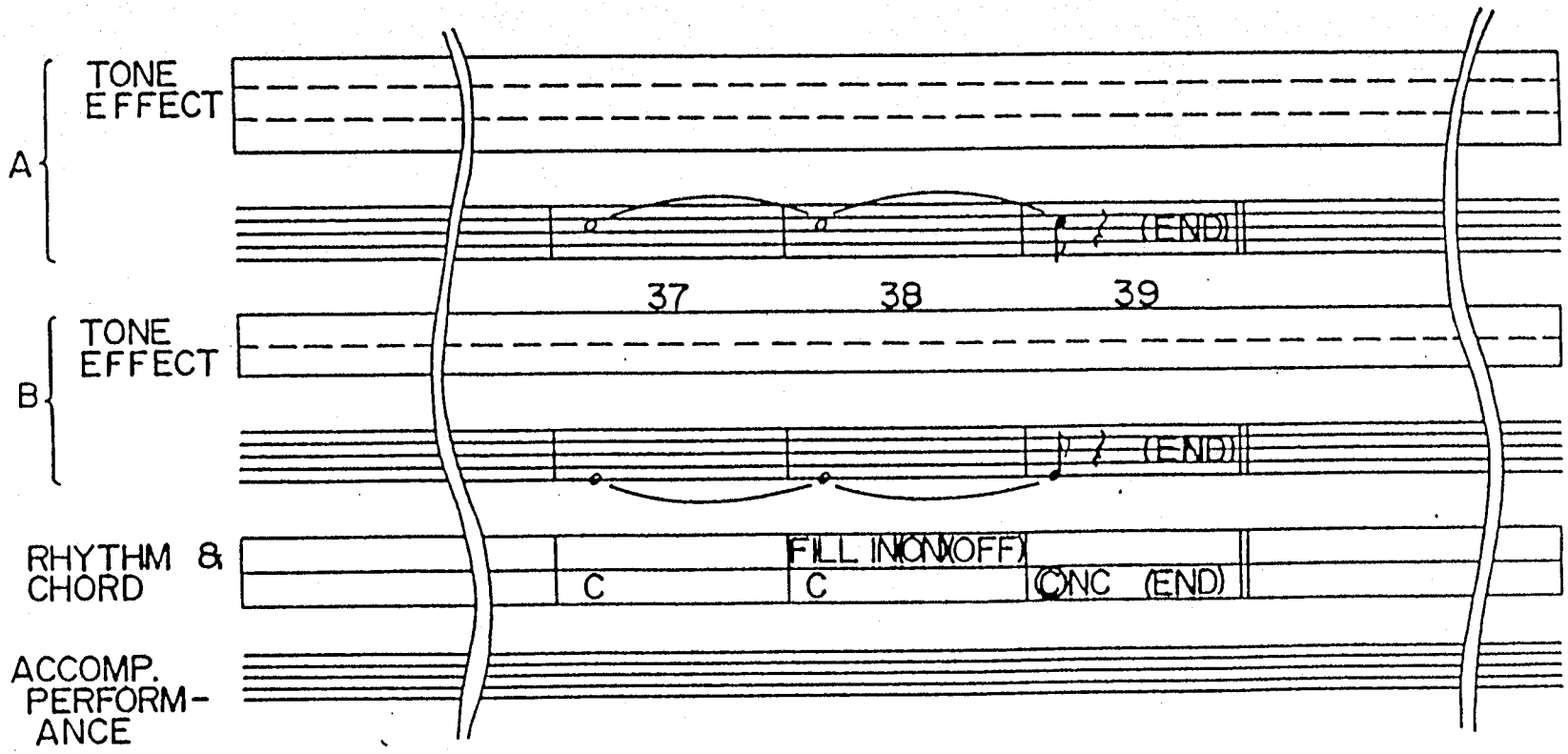

FIG. 17A and 17B show an example of musical piece stored in the ROM pack 25 or on the magnetic tape 32. The score shown is "Air on G String" by Bach.

Numbers shown between the melody and obligato lines represent the measure number. In the music score shown in FIG. 17, the melody, obligato and chord line data are shown in FIGS. 18A to 18C. Individual data is written in a variety of formats as described in connection with FIGS. 10A to 10J and 11A to 11G. In FIGS. 17A and 17B, and 18A and 18C, the circled letters indicate an off chord, and symbol NC indicates when no chord is present.

The operation of the above embodiment will now be described with reference to FIGS. 19 through 27.

First, a given ROM pack 25 is set in the ROM pack setting section 6. Th cord 24 leading from the tape recorder 31 is connected to the interface circuit provided in the interface circuit setting section 7. Then, the power switch 23 of the electronic musical instrument 1 is turned on, making it ready to automatically play using the ROM pack 25 or the magnetic tape 32.

Figure 19:
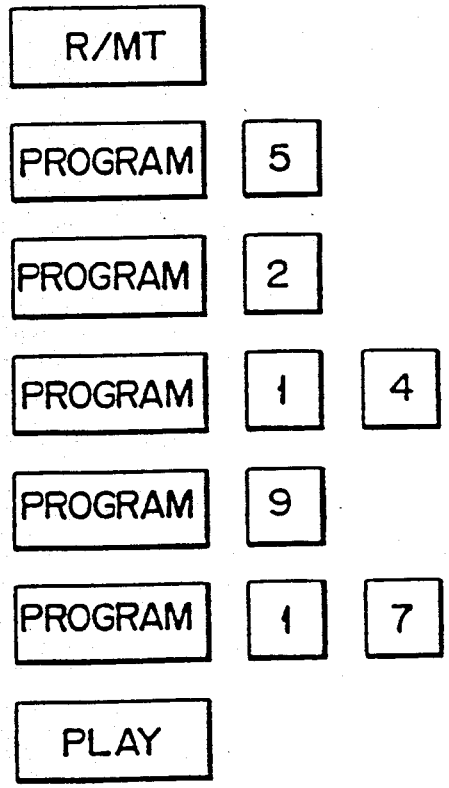
FIG. 19 is a view showing the order of operating the keys when selecting a ROM pack, or a magnetic tape containing several musical pieces.
Figure 20:
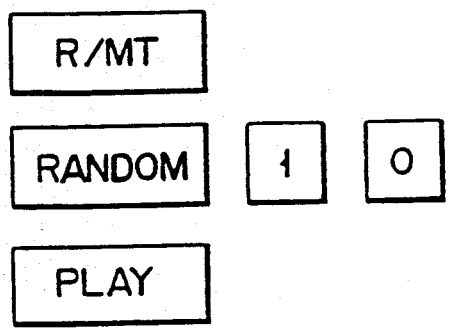
FIG. 20 is a view showing the order of operating the keys to randomly designate a ROM pack or magnetic tape containing several musical pieces.
Figure 21:
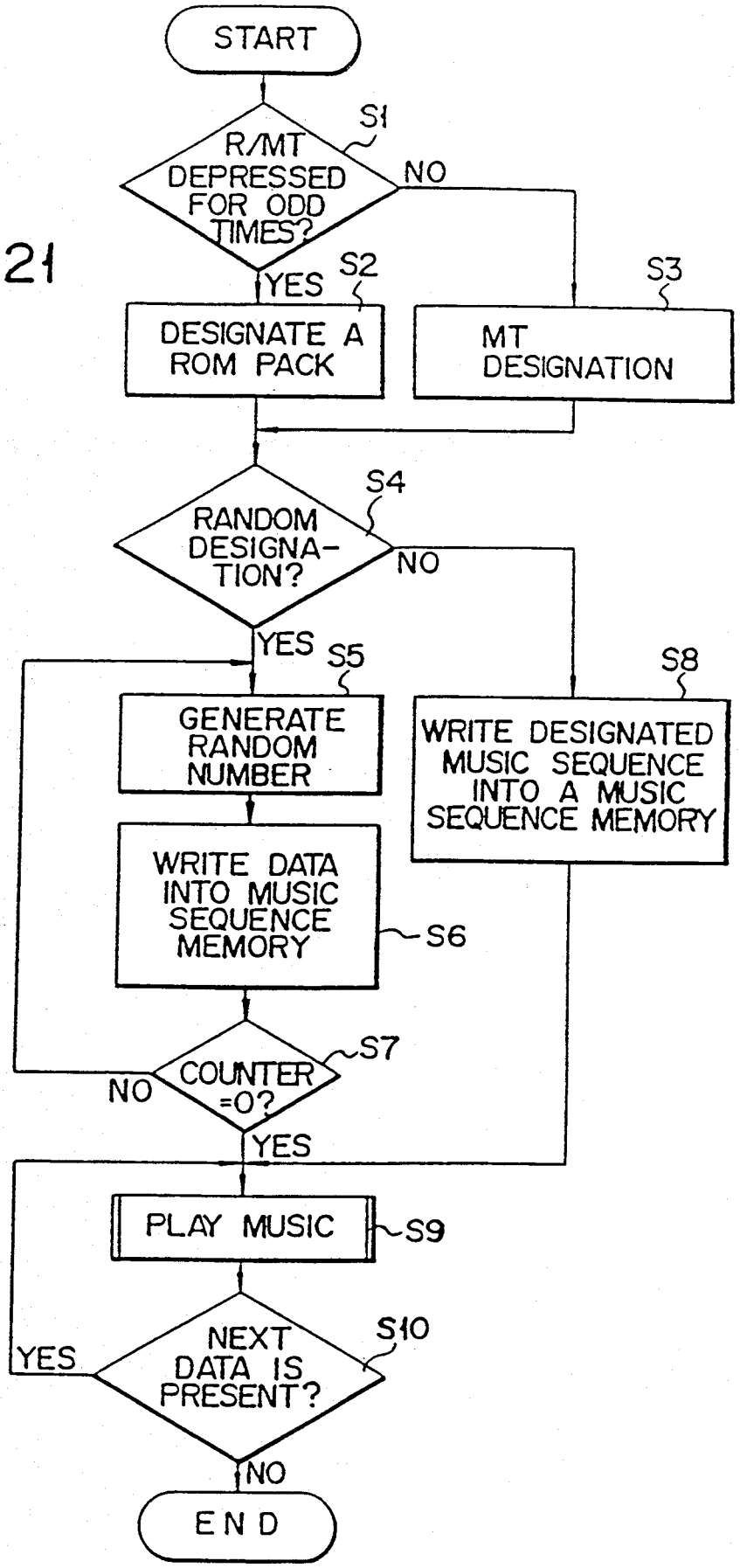
FIG. 21 is a general flow chart showing how musical pieces are automatically played according to the designated music sequence.

To specify the pieces to be automatically played from the ROM pack 25, the number of the piece is entered into the music sequence memory 41 by operating the keys shown in FIG. 19. First, the R/MT switch 18 is operated for an odd number of times. The output of this key is fed to the control section 28. The control section 28 decides that the ROM pack 25 is selected (steps $S_1$ and $S_2$) in the flow chart of FIG. 21). If pieces having the numbers 5, 2, 14, 9, and 17, for instance, are designated, the data for these pieces is input one after another by operating the 12 keys from $B_3$ to $B_4$ as shown in FIG. 19. Since the program key for note $B_4$ is operated, the random number generator 42 is not rendered operative, and the designated musical sequence having 5 pieces is written as such in the musical sequence memory 41 (steps $S_4$ and $S_8$). When the play switch 22A is subsequently operated, the designated musical pieces are read out from the ROM pack 25 and are automatically played (steps $S_9$ and $S_{10}$).

When the R/MT switch 18 is also operated for an odd number of times to input random musical sequence data in the music sequence memory 41, steps $S_1$ and $S_2$ are executed. When 10 music pieces are to be selected, for instance, random designation data is input by operating the random key for not E $B_3$. The designation is detected in step $S_4$, and the number 10 is then set in the counter 43 in the random number generator 42. At the same time, the random number generator 42 is operated to generate random number data one by one to be written in the music sequence memory 41 (steps $S_5$ and $S_6$). At this time, the data 10 which has been set in the counter 43 is decreased by one every time one random number is generated. When 10 random numbers have been generated and written in the musical sequence memory 41, the counter 43 becomes 0. This is detected in step $S_7$, which renders the random number generator 42 inoperative. When the play switch 22A is subsequently operated, a music piece is automatically played (steps $S_9$ and $S_{10}$).

When selecting musical pieces preset on the magnetic tape 32, the R/MT switch 18 is operated for an even numbers of times, whereby data representing the selection of the magnetic tape 32 is fed to the control section 28. As for the rest of the sequence, the key operation procedure is entirely the same as that shown in FIGS. 19 and 20. Subsequent to step $S_1$, step $S_3$ is executed in which the magnetic tape designation data is stored in the control section 28. Step $S_{10}$ in FIG. 21 checks if any musical sequence data has been preset in the musical sequence memory 41, i.e., if all the preset data music pieces have been played.

Figure 26:
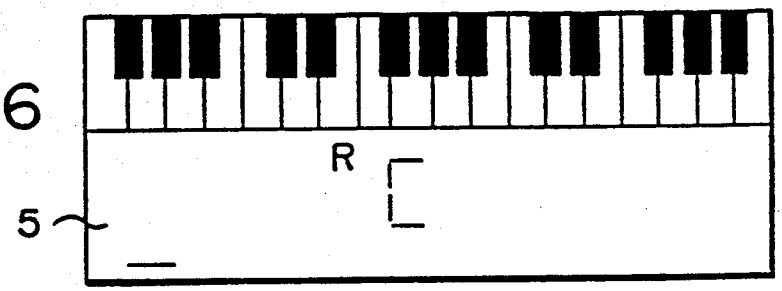
FIG. 26 is a view showing a display section when a ROM pack is selected.
Figure 27:
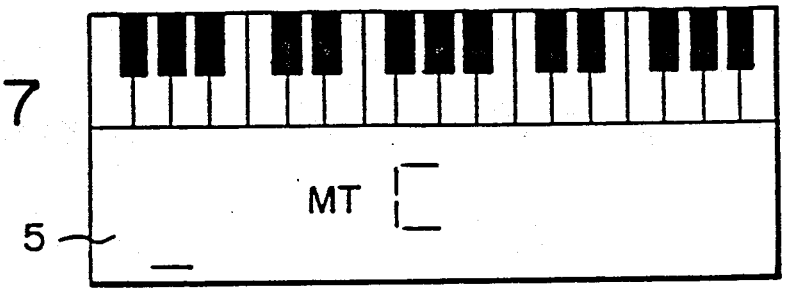
FIG. 27 is a view showing a display section when a magnetic tape is selected.

When the ROM pack 25 is selected, the symbol "R" is displayed on the display section 5 as shown in FIG. 26. When the magnetic tape 32 is selected, the symbol "MT" is displayed as shown in FIG. 27.

Figure 23:
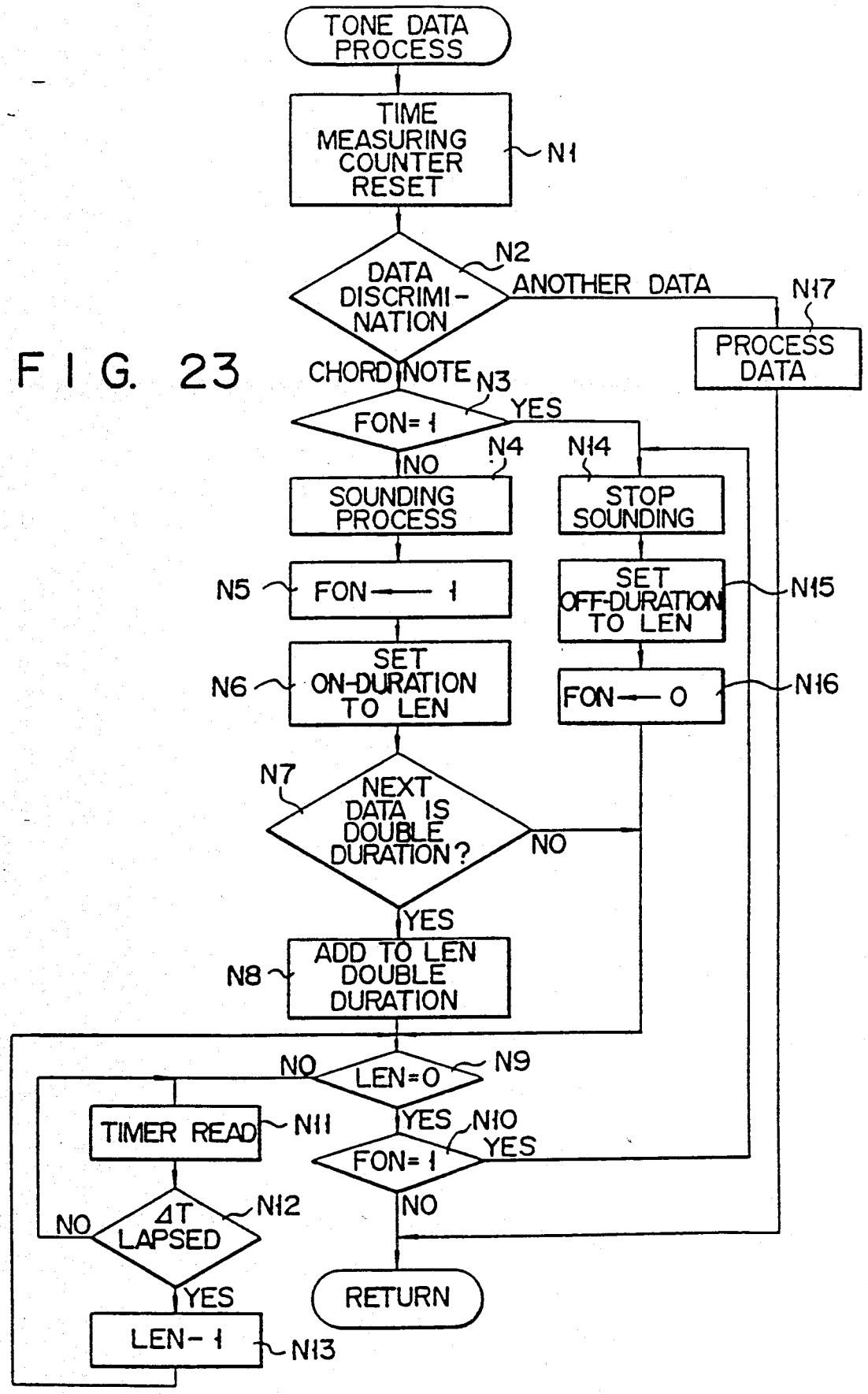
FIG. 23 is a flow chart illustrating the tone data process step.
Figure 24:
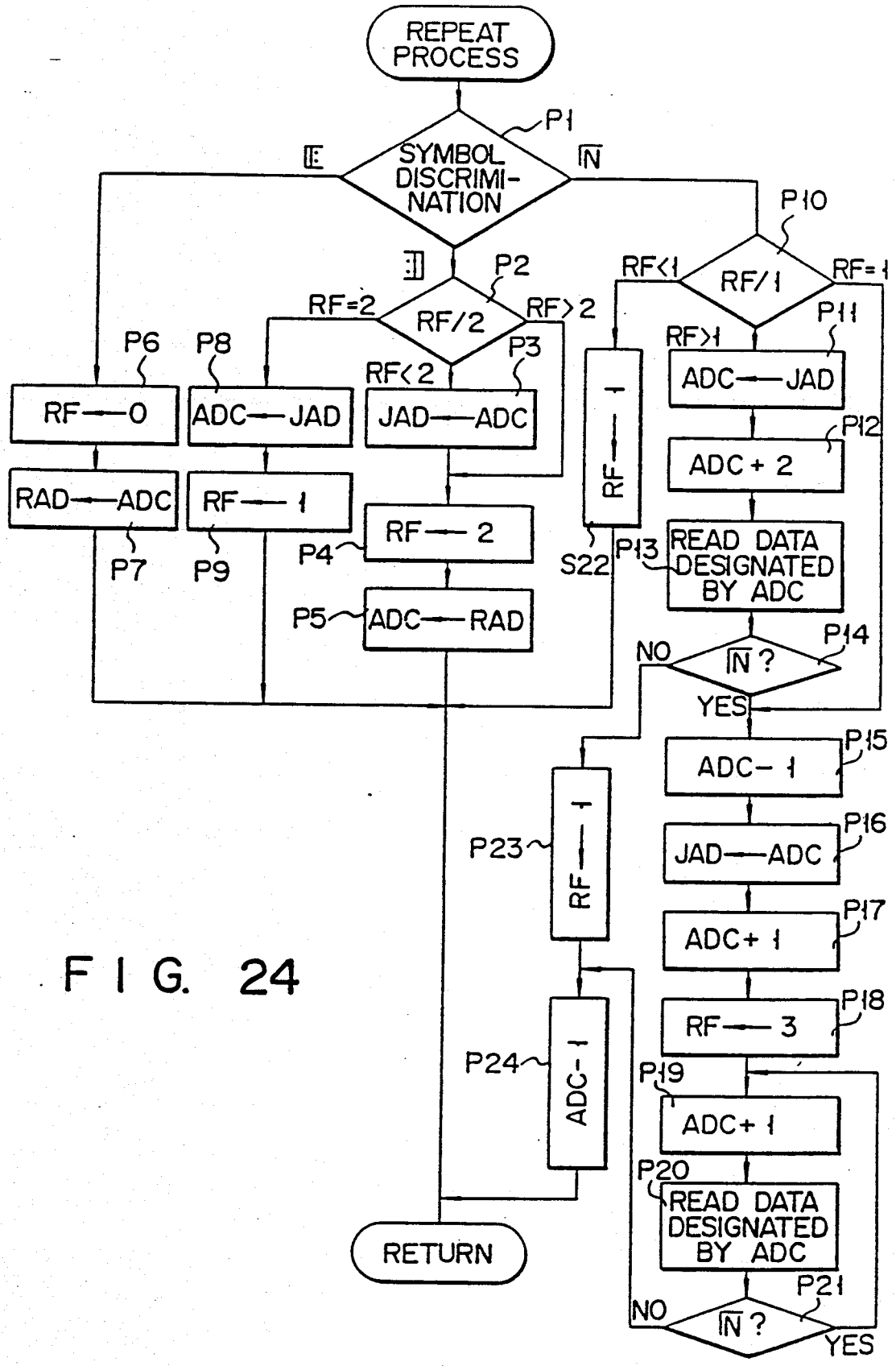
FIG. 24 is a flow chart illustrating the repeat process step.

The automatic playing step $S_9$ will now be described in detail with reference to the flow charts of FIGS. 22 through 24. When the routine is started, the number of the first piece is read out from the musical sequence memory 41. When the ROM pack 25 has been selected, the control section 28 sets the initial address of the read-out piece data in the address counter 30. Then it proceeds to read out the musical data for one piece of music from the ROM pack 25 while at the same time incrementing the address counter 30, the read-out data being written in the internal RAM 29 through the buffer 44. When the data of one piece is written in the internal RAM 29, the automatic play of the piece is started.

Figure 22:
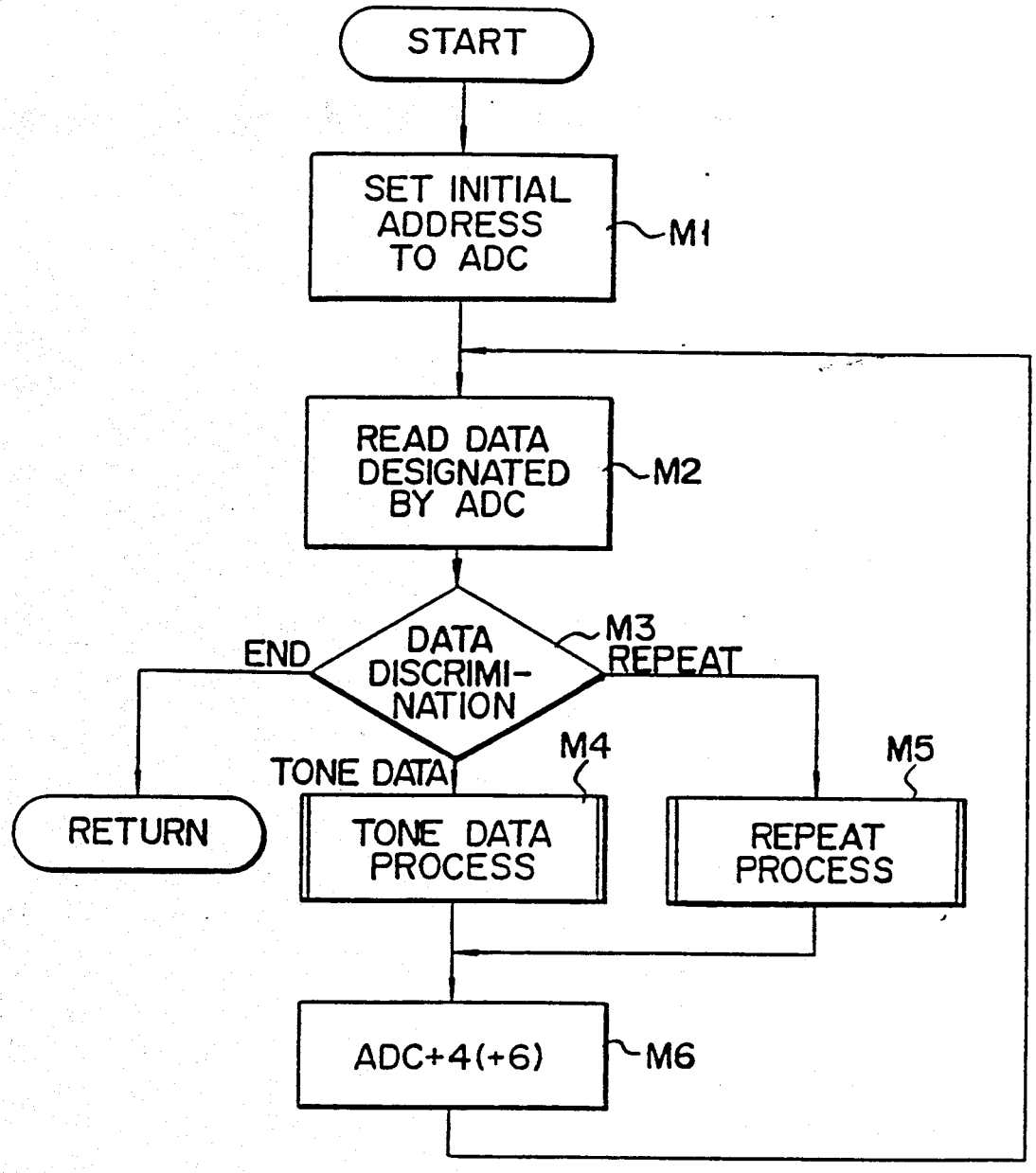
FIG. 22 is a flow chart illustrating how a musical piece is played.

More specifically, the control section 28 sets the initial address of the internal RAM 29 in the address counter (ADC) 51 (step $M_1$ in FIG. 22). The data designated by the ADC is then read out and fed to the control section 28 (step $M_2$). The control section 28 then discriminates the data as being tone data, repeat data or end data (step $M_3$). If the data is determined to be tone data, step $M_4$ of the tone data process is executed. More particularly, the control section 28 feeds data based on the tone data to the first melody generator 34, the second melody generator 35, the chord generator 36, the bass generator 37 and to the rhythm generator 38 to generate the respective tone signals which are then coupled through the amplifier 39 and loudspeaker 40 to produce an audible sound from the sounding section 4. At this time, tone generation is effected simultaneously with the melody and obligato line data in the first and second melody generators 34 and 35. Further, chord, bass and rhythm are simultaneously generated according to chord line data in the chord generator 36, the bass generator 37 and the rhythm generator 38. Steps of tone data process will be described later in detail with reference to the flow chart of FIG. 23.

After the simultaneous tone data process for the melody, obligato and chord lines in step $M_4$ has been executed, step $M_6$ is executed, causing the control section 28 to increase the address counter 51 by 4 for the chord line while increasing both the melody and obligato lines by 6. The routine then returns to step $M_2$ to read out the next data.

If the discriminated data in the step $M_3$ is repeat data, step $M_5$ of the repeat process is executed, which will be described later in detail with reference to the flow chart of FIG. 24. When this process is completed, step $M_6$ is executed, and the routine is returned to step $M_2$. If the discriminated data is end data, which means that the piece play has ended, a check is done to see if there is more music sequence data. Since only the first piece has ended, the instrument automatically begins to play the second piece. When all of the pieces within the preset sequence have been played, the automatic play function stops.

Step $M_4$ of tone data process will now be described with reference to the flow chart of FIG. 23. The tone data read out from the ROM pack 25 is set in the data register 45. When the process is started, the time measuring counter 50 is reset (step $N_1$). Then, the data-identifying section 46 identifies the tone data as being note data, timbre data, and so on for the melody and obligato lines, or as being chord data, rhythm data or tempo data, etc. for the chord line (step $N_2$). If the identified data is note or chord data, step $S_3$ is executed to check if the ON flag (F ON) 54 has the value of "1". If the identified data is other than note or chord data, step $N_{17}$ is executed to set or reset the timbre, rhythm, or tempo, etc. When this has been completed, the process is shifted to judge the next tone data.

The ON flag 54 has the value "1" only when a tone is being sounded, otherwise it is "0". If it is "0", the tone or chord is made audible in the manner described in step $N_4$, and the ON flag 54 is set to "1" (step $N_5$). After that, the ON-duration data is set in the tone duration register 47 (step $N_6$). The data-identifying section 46 then checks to see if the next data is double duration data. If it is not, step $N_9$ is executed. If it is, step $N_8$ is executed to add the double duration data (i.e., upper bit data $u_1$, $u_2$ of the tone duration data) to the lower bit data $L_1$, $L_2$ set in the tone duration register 47. Then, the data-identifying section 46 checks to see if the data in the tone duration register 47 is 0 (step $N_9$). If it is not "0", step $N_{11}$ is executed to see if the time count data of the time measuring counter 50 has been read and if the unit time ($\Delta t$) has lapsed. If the prescribed unit time has not yet lapsed, steps $N_{11}$ and $N_{12}$ are repeatedly executed. When the unit time has lapsed, step $N_{13}$ is executed, and the tone duration register 47 is decreased by 1. Next, step $N_9$ is executed. The steps $N_9$, $N_{11}$, $N_{12}$ and $N_{13}$ are repeatedly executed until the ON time has lapsed. When the ON time has lapsed so that the contents of the tone duration register 47 are 0, step $N_{10}$ is executed to see if the ON flag 54 having the value of "1" has been checked. Since the ON flag 54 has the value "1" at this time, steps $N_{14}$ and $N_{15}$ are executed to set the OFF time in the tone duration register 47. Then the ON flag 54 changes its value to "0" (step $N_{16}$). Step $N_9$ is executed, and the steps $N_9$, $N_{11}$, $N_{12}$ and $N_{13}$ are executed until the OFF time has lapsed so that the contents of the tone duration register 47 are "0". When the OFF time has lapsed, step $N_{10}$ is executed. Since the ON flag 54 has the value of "0", the process is repeated for the next tone data.

Figure 25A:
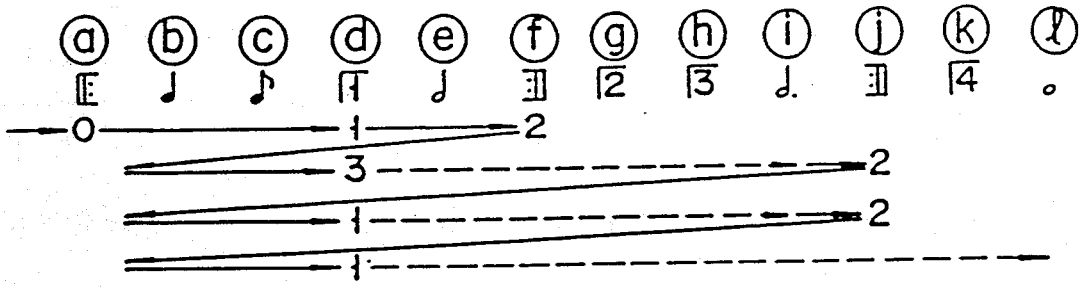
FIGS. 25A to 25E are views showing examples of the repeat performance and the repeat flag change.
Figure 25B:
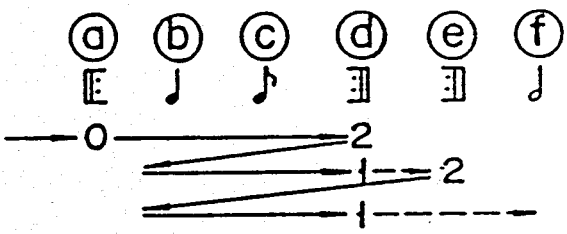
Figure 25C:
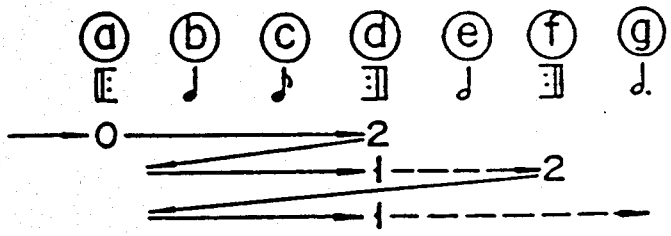
Figure 25D:
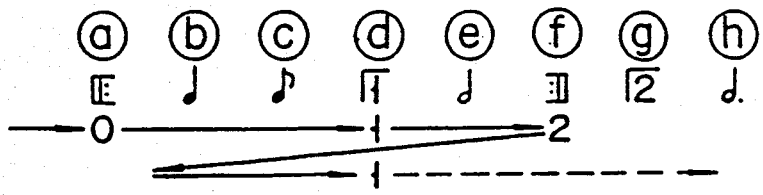
Figure 25E:
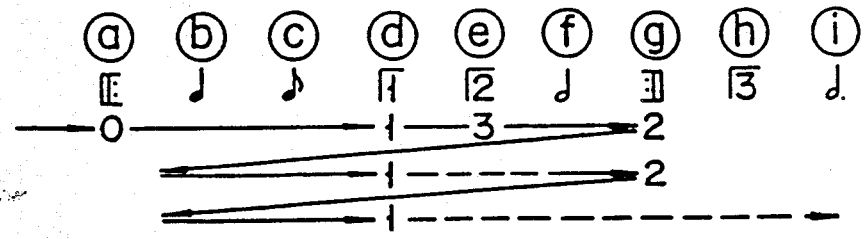

Step $M_5$ of repeat process will now be described with reference to the flow chart of FIG. 24. A piece in which repeat play occurs is shown in FIG. 25A. In the figure, the process of the piece is indicated by the circled letters ⓐ to ⓘ. and by the numerals 0, 1, 2 and 3 which represent the respective contents of the repeat flag (RF) register 48. When the repeat command data as shown in FIG. 10C-2 is registered in the data register 45, the repeat process is started. The data identifying section 46 identifies if the repeat symbol is, ⊡ or ⊡, when N has a value from 1 to 8 (step $P_1$). If it is identified as a symbol ⊡, data 0 is set in the repeat flag register 48 (step $P_6$). Then the prevailing data (a) in the address counter (ADC) 51 is set in the return address register (RAD) (step $P_7$). Then step $M_6$ (FIG. 22), i.e., the switching ON and OFF of the quarter note and the eighth note, is executed. When repeat data ⊡ is read out at the step ⓓ, the repeat process is started, and the symbol ⊡ is identified in step $P_1$. Thus, step $P_{10}$ is executed to check if the contents of the repeat flag 48 are "1", greater than "1", or less than "1". Since the contents are "0", i.e., less than "1", at this moment, step $P_{22}$ is executed, and data "1" is set in the repeat flag register 48. Then step $M_6$, i.e., the ON and OFF process for the next half-note at the step ⓔ, is executed. When the repeat symbol □ at ⓕ is fed to the data register 45, the repeat process is started once again, and the sequence continues from step $P_1$ to step $P_2$.

In step $P_2$, a check is done to see if the contents of the repeat flag 48 is "2", greater than "2", or less than "2". Since it is less than "2" at this time, step $P_3$ is executed in which the prevailing value ⓕ in the address register 51 is set in the jump address register (JAD) 53. Then, the value of data 2 is set in the repeat flag register 48 (step $P_4$). The address of the repeat data (symbol ⊡) stored in the return address register 52 is set in the address counter 51 (step $P_5$). Then the step $M_6$, i.e., the process for the next tone data, i.e., the quarter note at ⓑ, is started.

The repeat data at ⓓ, i.e., symbol ⊡, is set again in the data register 45 after the ON and OFF process of the quarter note and eighth note at ⓑ and ⓒ, and after the repeat play has been executed. Following this, step $P_1$ and the step $P_{10}$ are executed. Since the repeat flag register contents have the value of "2", i.e., greater than "1", Step $P_{11}$ is executed to set the data ⓕ in the jump address register 53 in the address counter 51. The contents of the address counter 51 are incremented by 2, and the data ⊡ of the address ⓗ is read out and stored into the data register 45 (steps $P_{12}$ and $P_{13}$). Step $P_{14}$ is executed to check the data ⊡. Then the contents of the address counter 51 is decreased by 1 to ⓖ (step $P_{15}$) and are set in the jump address register 53 (step $P_{16}$). Then the address counter 51 is increased by 1 to ⓗ (step $P_{17}$). The data having the value "3" is then set in the repeat flag register 48 (step $P_{18}$), and the contents of the address counter 51 are increased by 1 to ⓘ (step $P_{19}$). Then the dotted half note at ⓘ is read out (step $P_{20}$), and judged to see if it has the value ⊡ (step $P_{21}$). Since it is not ⊡, step $P_{24}$ is executed, and the address counter 51 is decreased by 1 to ⓗ. Then step $M_6$ of the

AVAILABLE COPY tone ON and tone OFF process on the dotted half note in ⓘ is executed.

When it has been detected in the step $P_1$ that the repeat symbol ⊡ in the score at ⓘ has been read, step $P_2$ is executed. Since the repeat flag has a value of "3", i.e., greater than "2", step $P_4$ is executed, in which data having a value of 2 is set in the repeat flag register 48. Then step $P_5$ is executed, in which the address ⓐ in the return address register 52 is set in the address counter 51. Next, step $M_6$ which produces the tones at ⓑ and ⓒ is executed. When it has been detected in step $P_1$ that the symbol ⊡ at d has been read out, step $P_{10}$ is executed. Since the repeat flag data is "2", i.e., greater than "1", step $P_{11}$ is executed, and the address ⓖ in the jump address counter 53 is set in the address counter 51 which is increased by "2" to ⓘ (step $P_{12}$). Then the data representing the dotted half note, is read out (step $P_{13}$), and step $P_{14}$ is executed. In step $P_{14}$, the data is judged not to be the symbol ⊡. Thus, data having the value of 1 is set in the repeat flag register 28 (step $P_{23}$), and the address counter 51 is decreased by 1 to ⓗ. Then the routine is returned to the step $M_6$ to reproduce the dotted half note in ⓘ.

When it has been detected in the step $P_1$ that the repeat symbol ⊡ at ⓘ has been read out, step $P_2$ is executed. Since the repeat flag data is "1", i.e., smaller than "2", step $P_3$ is executed, and the prevailing value ⓘ in the address counter 5 is set in the jump address register 53. Then data having the value of 2 is set in the repeat flag register 48 (step $P_4$), and the address ⓐ in the return address register 52 is set in the address counter 51 (step $P_5$). Then the routine once again returns to step $M_6$ to reproduce the tones at ⓑ and ⓒ.

When it has been detected in step $P_1$ that the symbol ⊡ at ⓓ has been read out again, step $P_{10}$ is executed. Since the repeat flag data is "2", i.e., greater than 1, step $P_{11}$ is executed, and the address ⓘ in the jump address counter 53 is set in the address counter 51. The address counter 51 is then increased by 2 to ⓘ (step $P_{12}$). Then the data, i.e., the whole note, is read out (step $P_{13}$). In the next step $P_{14}$, the data is judged not to be the symbol ⊡. Thus, step $P_{23}$ is executed; the data "1" is set in the repeat flag register 48; and the address counter 51 is decreased by 1 to ⓚ (step $P_{24}$). The routine is then returned to the step $M_6$ to reproduce the whole note.

While the repeat process which has been described above in connection with the musical score shown in FIG. 25A, FIGS. 25B to 25E show how the contents of the repeat flag register 48 vary in other music pieces having repetition. In all of these cases, the repeat play is executed in accordance with the flow chart of FIG. 24. The repeat flag data "0" indicates that a new musical phrase has been entered after the repeat symbol has been read out. The repeat flag data "1" indicates that another phrase is selected when the repeat flag data has the value of 2, or when the symbol ⊡ is read out when the repeat flag data is 2 or 3 and the data preceding by two pieces of data is not ⊡. The repeat flag data "2" indicates that the repeat symbol ⊡ has been read out when the repeat flag data is other than 2. The repeat flag data having the value of "3" indicates that the symbol ⊡ read out when the repeat flag data is 1, and also that the data preceding by 2 is the symbol ⊡ when the repeat flag data is either 2 or 3.

While in the above embodiment a ROM pack has been used, a RAM pack may also be used. Also, any magnetic recording device other than the magnetic tape recorder may be utilized.

As has been described in the foregoing, the automatically playing instrument according to the invention has a memory pack containing data for a plurality of musical pieces which can be selected and automatically played. Thus, complex musical pieces can be automatically played more inexpensively than with the prior art apparatus of this kind.

Additionally, with the auto-playing apparatus according to the invention a memory pack and a magnetic recording apparatus such as a tape recorder with musical piece data preset therein may be used, either one of which may be selectively used for automatic playing. Thus, the automatic playing music may be readily enjoyed without requiring the connection of a recording medium when changing the recorded media.

Further, with the auto-playing apparatus according to the invention, a memory pack is used in which melody, obligato data, and chord data which are to be played simultaneously in one musical piece are sequentially stored as musical data so that a plurality of different melodies can be automatically and simultaneously played with chords. Thus, automatic playing having richer musical expression can be obtained.

Still further, with the auto-playing apparatus according to the invention, a memory pack is used in which musical piece data containing repeat data is stored and in which a musical phrase can be repeatedly and automatically played according to the previously read-out repeat data. Thus, musical pieces having a number of repeated phrases can be stored using less of the memory.

Moreover, with the auto-playing apparatus according to the invention automatic playing can be obtained with a memory pack which stores musical piece data including pitch and tone duration data, and which also includes command data indicating which tone duration data is longer than the predetermined reference duration. Thus, tone duration data having a large value can be obtained using only a minimum amount of the memory, and automatic playing having a richer sound can be obtained.

What is claimed is:

1. An auto-playing apparatus of the kind including a case containing electronic circuitry and having a setting section for receiving an external [memory pack] *means for storing electrical signals*, comprising:

[a memory pack adapted to be] *means for storing electrical signals* removably set in the setting section provided in the case of the apparatus for electrical coupling to the circuits in the case, said [memory pack having] *storing means storing electrical signals in digital form related to* music data [on] *corresponding to* a plurality of music pieces [in digital form], and respective musical number data corresponding to each of said plurality of music pieces;

a keyboard with keys corresponding to pitches of several octaves to enable execution of a manual play;

a switch *means* for designating a manual play or an automatic play according to the music data stored in said [memory pack] *storing means*, some of the keys in said keyboard, when said switch [designating] *means designates* the automatic play, being set to operate as designating keys for selectively designating musical number data corresponding to the plurality of the music pieces which are stored in said [memory pack] *storing means;*

United States Patent Office

PTO - BOYERS, PA Duty Station

MISSING PAGE TEMPORARY NOTICE

PATENT # Re. 33,607 FOR ISSUE DATE 6-11-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 15, 16

Data Conversion Operation

Boyers, Pa the case of said apparatus for electrical connection to said magnetic tape reproducing means and said control means.

7. An auto-playing apparatus of the kind including a case containing electronic circuitry [and having a setting section for receiving an external memory pack], comprising:

[a memory pack adapted to be removably set in the setting section provided in the case of the apparatus for electrical coupling to the circuits in the case, said memory pack means having] *means for storing electrical signals in digital form related to* music data [on] *corresponding to* a plurality of music pieces [in digital form], said music data in said [memory pack] *storing means* including pitch data, tone duration data and command data indicative of the fact that the value of tone duration data is greater than a reference value, and respective musical number data corresponding to each of said plurality of music pieces;

designating means for selectively designating musical number data on a music piece among said plurality of music pieces which are stored in said [memory pack] *storing means;* a memory *means*, coupled to said designating means, for storing the musical number data designated by said designating means in the designated order;

control means, coupled to said [memory pack] *storing means* and said memory *means*, for reading, in the order of the musical number data stored in said memory *means*, the music data in said [memory pack] *storing means* corresponding to the musical number data in said memory *means* and for outputting the music data, said control means executing, when said command data is read out from said [memory pack] *storing means*, a calculation on the pertinent tone duration to calculate proper tone duration and to give the pertinent pitch data to said reproducing means, in accordance with said proper done duration; and reproducing means, coupled to said control means, for reproducing music *in* accordance with the music data outputted from said control means.

8. The auto-playing apparatus according to claim 7, wherein said music data in said memory pack] *storing means* includes tempo data, said control means sequentially sends said music data to said reproducing means in accordance with said tempo data, and said reproducing means reproduces the music piece with a tempo according to said tempo data.

9. The auto-playing apparatus according to claim 7, wherein said music data in said [memory pack] *storing means* includes repeat data, and said control means repeatedly reads out the music data according to said repeat data when said repeat data is read out from said [memory pack] *storing means.*

*10. An auto-playing apparatus of the kind including a case containing electronic circuitry, comprising:*

*means for storing electrical signals in digital form related to music data corresponding to a plurality of music pieces, and respective musical number data corresponding to each of said plurality of music pieces;*

*a keyboard with keys corresponding, respectively, to a plurality of pitches to enable execution of a manual play;*

*a switch means for selectively designating one of a manual play and an automatic play, said automatic play being performed in accordance with the music data stored in said storing means, some of the keys in said keyboard, when said switch means designates the automatic play, being set to operate as designating keys for selectively designating musical number data corresponding to the plurality of the music pieces which are stored in said storing means;*

*a memory means, coupled to said switch means and said designating keys of said keyboard, for storing musical number data in response to operation of said designating keys in said keyboard when said switch means designates the automatic play;*

*control means, coupled to said music data storing means and said memory means, for reading the music data in said storing means corresponding to the musical number data in said memory means and for outputting the music data; and*

*reproducing means, coupled to said control means, said keyboard and said switch means, for reproducing, when said switch means designates the manual play, the music corresponding to the keys of said keyboard and for reproducing, when said switch means designates the automatic play, the music in accordance with the music data outputted by said control means.*

*11. The auto-playing apparatus according to claim 10, wherein said memory means stores, in designated order, the musical number data on a plurality of music pieces in response to operation of the designating keys of said keyboard, and said control means repeatedly reads in the order of the musical number data stored in said memory means the music data in said storing means corresponding to the musical number data in said memory means to output the music data to said reproducing means.*

* * * * *

UNITED STATES PATENT AND TRADEMARK OFFICE

CERTIFICATE OF CORRECTION

PATENT NO. : RE.33,607

DATED : June 11, 1991

INVENTOR(S) : YUZAWA et al

It is certified that error appears in the above-identified patent and that said Letters Patent is hereby corrected as shown below:

Title page, Section [22] Filed:

Change the filing date "Jan. 30, 1990" to --Jan. 31, 1990--.

Signed and Sealed this

Seventeenth Day of August, 1993

Bruce Lehman

*Attest:*

BRUCE LEHMAN

*Attesting Officer*

*Commissioner of Patents and Trademarks*